(12) United States Patent
Waldman et al.

(10) Patent No.: US 7,728,959 B2
(45) Date of Patent: Jun. 1, 2010

(54) ACQUISITION OF HIGH RESOLUTION BIOMETRIC IMAGES

(75) Inventors: David A. Waldman, Concord, MA (US);
Vincent Fedele, Harvard, MA (US);
Richard T. Ingwall, Newton, MA (US);
Daniel H. Raguin, Acton, MA (US);
John S. Berg, Franklin, MA (US); Joby Joseph, New Delhi (IN); David L. Kent, Framingham, MA (US)

(73) Assignee: Aprilis, Inc., Maynard, MA (US)

( * ) Notice: Subject to any disclaimer, the term of this patent is extended or adjusted under 35 U.S.C. 154(b) by 848 days.

(21) Appl. No.: 10/561,646

(22) PCT Filed: Jun. 21, 2004
(Under 37 CFR 1.47)

(86) PCT No.: PCT/US2004/019917
§ 371 (c)(1),
(2), (4) Date: Oct. 16, 2006

(87) PCT Pub. No.: WO2005/001753
PCT Pub. Date: Jan. 6, 2005

(65) Prior Publication Data
US 2008/0123908 A1      May 29, 2008

Related U.S. Application Data

(60) Provisional application No. 60/480,008, filed on Jun. 21, 2003, provisional application No. 60/519,792, filed on Nov. 13, 2003, provisional application No. 60/523,068, filed on Nov. 18, 2003.

(51) Int. Cl.
*G06K 9/74*      (2006.01)

(52) U.S. Cl. ........................................................ 356/71
(58) Field of Classification Search .................... 356/71
See application file for complete search history.

(56) References Cited

U.S. PATENT DOCUMENTS 4,262,623 A      4/1981   Smith, III et al.

(Continued)

FOREIGN PATENT DOCUMENTS

WO      WO02/15118 A1      2/2002

(Continued)

OTHER PUBLICATIONS

Georges, M. P., et al., "Compact and Portable Holographic Camera Using Photorefractive Crystals. Application in Various Metrological Problems," *Appl. Phys. B*, 72: 761-765 (Apr. 20, 2001).

(Continued)

*Primary Examiner*—Roy Punnoose
(74) *Attorney, Agent, or Firm*—Weaver Austin Villeneuve & Sampson LLP

(57) ABSTRACT

An apparatus for image acquisition of topological features of the surface of skin. The apparatus comprises a waveguide, having an entrance edge and top and bottom surfaces; a light source, configured to direct a light beam at the entrance edge of the waveguide; a skin contact layer, disposed at or near the top surface of the waveguides; a holographic optical element (HOE), disposed at the top or at the bottom surfaces of the waveguide, configured to diffract the light beam incident from the light source to the skin contact layer; a sensor array, configured to detect light reflected from the surface of skin in contact with skin contact layer; and means for compensating for changes in the Bragg matching condition of the HOE due to temperature.

124 Claims, 17 Drawing Sheets

U.S. PATENT DOCUMENTS

| | | | |
|---|---|---|---|
| 4,544,267 A | 10/1985 | Schiller | |
| 4,643,515 A | 2/1987 | Upatnieks | |
| 4,728,186 A | 3/1988 | Eguchi et al. | |
| 4,737,001 A | 4/1988 | Moss | |
| 4,790,564 A | 12/1988 | Larcher et al. | |
| 5,077,803 A | 12/1991 | Kato et al. | |
| 5,088,817 A * | 2/1992 | Igaki et al. | 356/71 |
| 5,096,290 A | 3/1992 | Ohta | |
| 5,109,427 A * | 4/1992 | Yang | 382/127 |
| 5,177,353 A | 1/1993 | Schiller | |
| 5,177,802 A | 1/1993 | Fujimoto et al. | |
| 5,241,606 A | 8/1993 | Horie | |
| 5,295,208 A | 3/1994 | Caulfield et al. | |
| 5,465,311 A | 11/1995 | Caulfield et al. | |
| 5,488,659 A | 1/1996 | Miliani | |
| 5,515,184 A | 5/1996 | Caulfield et al. | |
| 5,629,764 A * | 5/1997 | Bahuguna et al. | 356/71 |
| 5,631,971 A | 5/1997 | Sparrow | |
| 5,736,734 A | 4/1998 | Marcus et al. | |
| 5,737,071 A | 4/1998 | Arndt | |
| 5,824,474 A | 10/1998 | Matsuhisa et al. | |
| 5,854,697 A | 12/1998 | Caulfield et al. | |
| 5,879,454 A | 3/1999 | Peng | |
| 5,892,599 A * | 4/1999 | Bahuguna | 359/15 |
| 5,926,555 A | 7/1999 | Ort et al. | |
| 5,974,162 A * | 10/1999 | Metz et al. | 382/124 |
| 5,986,746 A * | 11/1999 | Metz et al. | 356/71 |
| 6,002,787 A | 12/1999 | Takhar et al. | |
| 6,061,463 A * | 5/2000 | Metz et al. | 382/124 |
| 6,111,977 A | 8/2000 | Scott et al. | |
| 6,115,483 A | 9/2000 | Suga | |
| 6,151,142 A | 11/2000 | Phillips et al. | |
| 6,154,285 A | 11/2000 | Teng et al. | |
| 6,178,255 B1 | 1/2001 | Scott et al. | |
| 6,236,090 B1 | 5/2001 | Fujisawa | |
| 6,301,368 B1 | 10/2001 | Bolle et al. | |
| 6,341,028 B1 | 1/2002 | Bahuguna et al. | |
| 6,411,728 B1 | 6/2002 | Lee et al. | |
| 6,483,932 B1 | 11/2002 | Martinez et al. | |
| 6,628,813 B2 | 9/2003 | Scott et al. | |
| 6,658,164 B1 | 12/2003 | Irving et al. | |
| 6,661,631 B1 | 12/2003 | Meador et al. | |
| 6,665,427 B1 | 12/2003 | Keagy et al. | |
| 6,687,391 B1 | 2/2004 | Scott et al. | |
| 2003/0089702 A1 | 5/2003 | Carver et al. | |
| 2003/0229506 A1 | 12/2003 | Scott et al. | |
| 2006/0119837 A1 * | 6/2006 | Raguin et al. | 356/71 |

FOREIGN PATENT DOCUMENTS

WO     WO02/088878 A2     11/2002

OTHER PUBLICATIONS

Jiang, X., et al., "Detecting the Fingerprint Minutiae by Adaptive Tracing the Gray-Level Ridge", Pattern Recognition, Elsevier, Kidlington, GB, 34, No. 5: 999-1013 (May 5, 2001).

Vizcaya, P. R., et al., "Multi-Resolution Fuzzy Approach for Singularity Detection in Fingerprint Images", Proceedings of the SPIE, SPIE, Bellingham, VA, pp. 46-56, (Nov. 19, 1996).

* cited by examiner

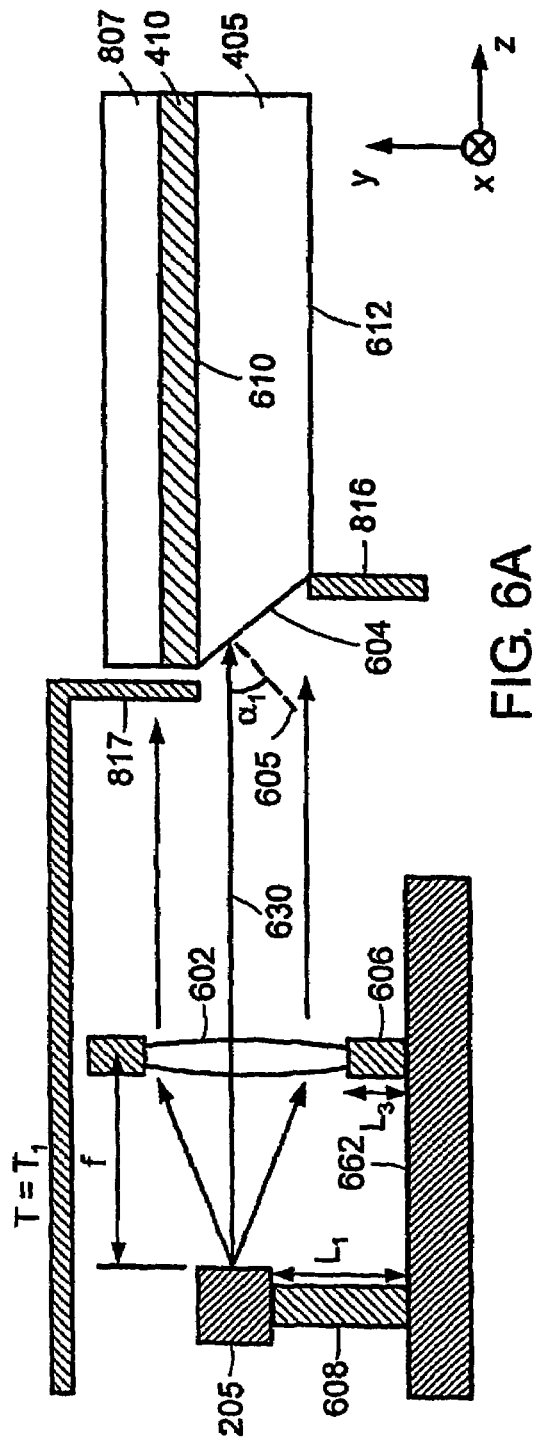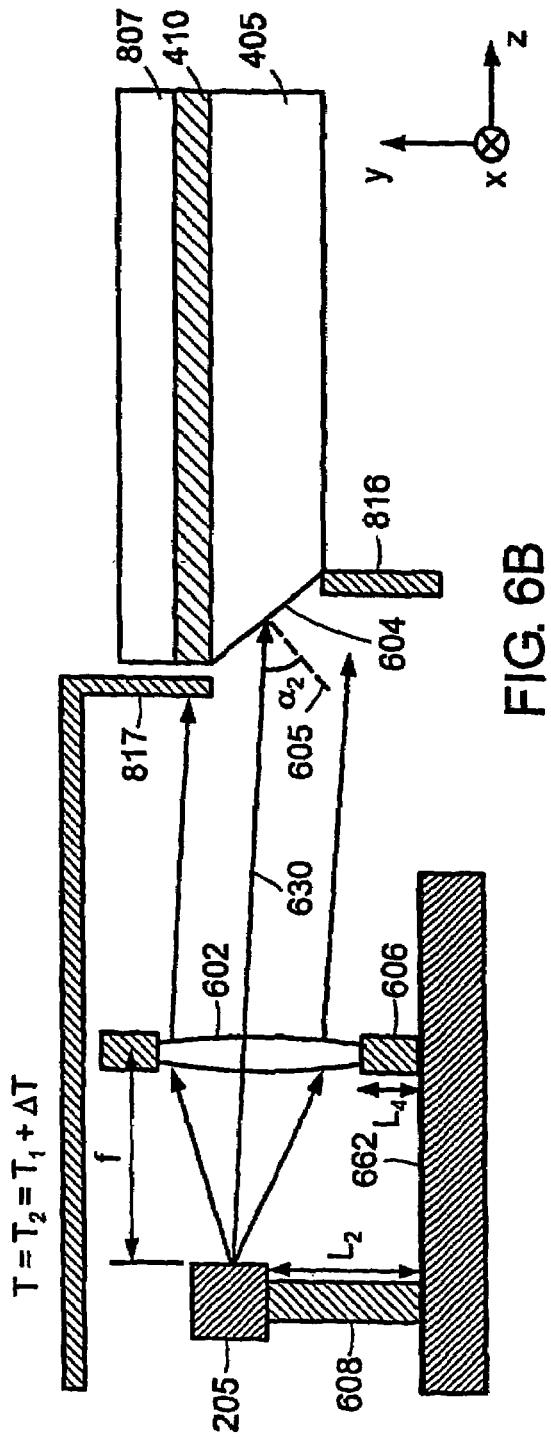

ACQUISITION OF HIGH RESOLUTION BIOMETRIC IMAGES

RELATED APPLICATIONS

This application is the U.S. National Stage of International Application No. PCT/US2004/019917, filed Jun. 21, 2004, published in English, and claims priority under 35 U.S.C. §119 or 365 to U.S. Provisional Application No. 60/480,008, filed on Jun. 21, 2003, U.S. Provisional Application No. 60/519,792, filed on Nov. 13, 2003 and U.S. Provisional Application No. 60/523,068, filed on Nov. 18, 2003. This application is related to the PCT Application entitled "Method and Apparatus for Processing Biometric Images" filed on Jun. 21, 2004 under the International Application No. PCT/US2004/019713. The entire teachings of the above applications are incorporated herein by reference.

BACKGROUND OF THE INVENTION

Growing concerns regarding domestic security have created a critical need to positively identify individuals as legitimate holders of credit cards, driver's licenses, passports and other forms of identification. The ideal identification process is reliable, fast, and relatively inexpensive. It should be based on modern high-speed electronic devices that can be networked to enable fast and effective sharing of information. It should also be compact, portable, and robust for convenient use in a variety of environments, including airport security stations, customs and border crossings, police vehicles, home and office computing and entrance control sites of secure buildings.

A well established method for identification is to compare a fingerprint with a previously obtained authentic fingerprint of the individual. Fingerprints have traditionally been collected by rolling an inked finger on a white paper. Since this traditional process clearly fails to meet the criteria listed above, numerous attempts have been made to adapt an electronically imaged fingerprint method to address new security demands. These modern proposals all use, as a key component, a solid-state device such as a capacitive or optical sensor to capture the fingerprint image in a digital format. By using a new type of solid-state imager as part of a fingerprint identification apparatus a fingerprint can be collected conveniently and rapidly, for example, during a security check, and subsequently correlated, in near real-time, to previously trained digital fingerprints in an electronic data base that resides either in a computer at the security check point, a secure but portable or removable storage device, or on a remotely networked server.

A typical fingerprint comprises a pattern of ridges separated by valleys, and a series of pores that are located along the ridges. The ridges are usually 100 to 300 µm wide and can extend in a swirl-like pattern for several mm to one or more cm. These ridges are separated by valleys with a typical ridge-valley period of approximately 250-500 µm. Pores, roughly circular in cross section, range in diameter from about 60 µm to 240 µm and are aligned along the ridges and can be isolated or grouped into two or more abutting or near abutting pore clusters. There are typically more than 400 pores within a fingerprint region with a frequency of occurrence of about 21 pores/cm of ridge length (see Roddy A. and Stosz J., Proceed; IEEE, 85, 9, 1390-1421 (1997). Almost all present-day fingerprint identification procedures use only ridge/valley minutiae patterns. These are simplified and identified as a pattern of ridge/valley features such as end points, deltoids, bifurcations, crossover points, and islands, all together referred to as minutiae. Typically, a relatively large area of the fingerprint is required in order to obtain enough unique minutiae features, for example, at least 0.50×0.50 inches. Most modern fingerprint imagers therefore use up to one full inch square or even larger, in order to obtain enough features to perform a useful means of identification. Fingerprints are compared using primarily this simplified description of the minutiae patterns.

Due to the more demanding resolution requirements necessary to successfully image pores, there are no commercial devices available today that use pores for fingerprint identification, even though there are typically 7 to 10 ten times as many pores as minutiae in a given fingerprint area. A typical fingerprint image as small as 0.1×0.1 inches may only contain 2-5 minutiae points, not enough to reliably identify a unique individual. The same area, however, may typically contain as many as 40 to 50 pores and several thousand ridge contour details, which along with a few minutiae points can positively identify an individual reliably.

Most optical designs proposed for creating fingerprint images suffer important limitations that reduce their usefulness in real life applications. Many designs are not suitable, for example, to resolve pore patterns or fine detail of the contour of the intersection of ridges and valleys in the fingerprint. Other designs produce distorted images that complicate fingerprint correlation, and still other designs are too bulky or delicate for convenient use in the field.

One optical design that reduces the overall size of the device uses holograms to diffract light in a desired direction. A common limitation of such devices is sensitivity of the intensity of illumination of the target topological surface to variation in temperature with respect to angle and wavelength of the incident light.

Accordingly, there is a need for a compact, high resolution device that reliably operates over a broad range of temperature.

SUMMARY OF THE INVENTION

The present invention relates to an apparatus and method of acquisition of an image of any surface topology present on skin, which, by way of example, can be a rolled and/or slap fingerprint, palm print, etc. and hereinafter for convenience will be referred to as a fingerprint.

In one embodiment, the present invention is an apparatus for fingerprint image acquisition, comprising a waveguide, having an entrance edge and top and bottom; a light source, configured to direct a light beam at the entrance edge of the waveguide; a skin contact layer, disposed at or near the top surface of the waveguide or bottom surface of the waveguide; a holographic optical element (HOE), disposed at the top or at the bottom surfaces of the waveguide, configured to diffract the light beam incident from the light source to the skin contact layer; a sensor array, configured to detect light reflected from the interface between skin and the skin contact layer. The HOE includes a layer comprising a grating and at least one supporting layer in contact with the said grating layer, wherein the grating layer and the at least one supporting layer have substantially similar coefficients of thermal expansion or thermo-optic coefficients or both.

In another embodiment, the present invention is an apparatus for image acquisition of topological features of the surface of skin, comprising a waveguide, having an entrance edge and top and bottom surfaces; a light source, configured to direct a light beam at the entrance edge of the waveguide; a skin contact layer, disposed at or near the top surface or the bottom surface of the waveguide; a holographic optical element (HOE), disposed at the top or at the bottom surfaces of the waveguide, configured to diffract the light beam incident from the light source to the skin contact layer; a sensor array, configured to detect light reflected from the interface between skin and the skin contact layer; and means for compensating for changes in the Bragg matching condition of the HOE due to changes temperature.

In one embodiment, the present invention is an apparatus for image acquisition of topological features of the surface of skin comprising a waveguide, having an entrance edge and top and bottom; a light source, configured to direct a light beam at the entrance edge of the waveguide; a skin contact layer, disposed at the top or bottom surface of the waveguide; a holographic optical element (HOE), disposed at the top or at the bottom surfaces of the waveguide, configured to diffract the light beam incident from the light source at the skin contact layer; a sensor array, configured to detect light reflected the interface between skin and the skin contact layer. The HOE includes at least two co-locationally multiplexed holograms.

In one embodiment, the present invention is an apparatus for image acquisition of topological features of the surface of skin comprising a waveguide, having an entrance edge and top and bottom surfaces; a light source, configured to direct a light beam at the entrance edge of the waveguide; a skin contact layer, disposed at the top or bottom surface of the waveguide; a holographic optical element (HOE), disposed at the top or at the bottom surfaces of the waveguide, configured to diffract the light beam incident from the light source at the skin contact layer; a sensor array, configured to detect light reflected from the interface between skin and the skin contact layer; and means for changing the wavelength of the light source.

In one embodiment, the present invention is an apparatus for image acquisition of topological features of skin surface comprising a waveguide, having an entrance edge and top and bottom surfaces; a light source, configured to direct a light beam at the entrance edge of the waveguide; a skin contact layer, disposed at the top surface of the waveguide; a holographic optical element (HOE), disposed at the top or at the bottom surfaces of the waveguide, configured to diffract the light beam at the skin contact layer and having a Bragg matching condition; a sensor array, configured to detect light reflected from the interface between skin and the skin contact layer, and means for compensating for changes in the Bragg matching condition of the HOE due to changes in temperature. The light source is a broad wavelength spectrum light source, the wavelengths of which can reconstruct the HOE.

In one embodiment, the present invention is a method of acquiring an image of the topology of the surface of skin, comprising receiving a surface of skin by a device for image acquisition of the topological features of the surface of skin wherein said device includes a holographic optical element (HOE) having a Bragg matching condition; directing a light beam at the HOE, thereby diffracting the light beam; directing the diffracted light beam at the interface between skin and the skin contact layer, thereby reflecting the light beam; compensating for temperature-induced changes in the Bragg matching condition of the HOE; and detecting the reflected light, thereby acquiring the image of the topological features of the surface of skin by said device.

It should be understood that the example embodiments described above, include a corresponding method or apparatus embodiments.

The device of the present invention is preferably compact, possesses a broad operating temperature range and advantageously allows the acquisition of images that capture pore structural features and fine detail features of the contour of the ridge structure in addition to standard minutiae structures. We have shown that the use of pores combined with the use of the fine detail of the ridge contour and the usual minutiae significantly increases the reliability of fingerprint comparisons, and substantially reduces the false accept rate, as well as providing positive identification with use of fingerprint sample areas as small as 0.1×0.1 inches.

Various example embodiments of the instrument used to acquire images of biometrics are described herein. The embodiments may also include alternative embodiments of the instrument and various embodiments of acquiring, modeling, preprocessing, and processing images of biometrics acquired by the instrument, such as those disclosed in a related application, entitled "Method and Apparatus for Processing Biometric Images," U.S. application Ser. No. 10/561,647, being filed concurrently herewith. The entire teachings of the related application are incorporated herein by reference.

BRIEF DESCRIPTION OF THE DRAWINGS

FIGS. 6A-6E are mechanical diagrams of alternative embodiments of the imager in the fingerprint sensor of FIG. 1;

DETAILED DESCRIPTION OF THE INVENTION

A description of preferred embodiments of the invention for a fingerprint biometric follows. It should be understood that the principles of the present invention and example preferred embodiments of the methods and apparatus described below may be applied to other biometrics, including: ear shape and structure, facial or hand thermograms, iris or retina structure, handwriting, fingerprints, palm prints, foot prints, toe prints, or prints of other areas of the skin, including hair.

Figure 1:
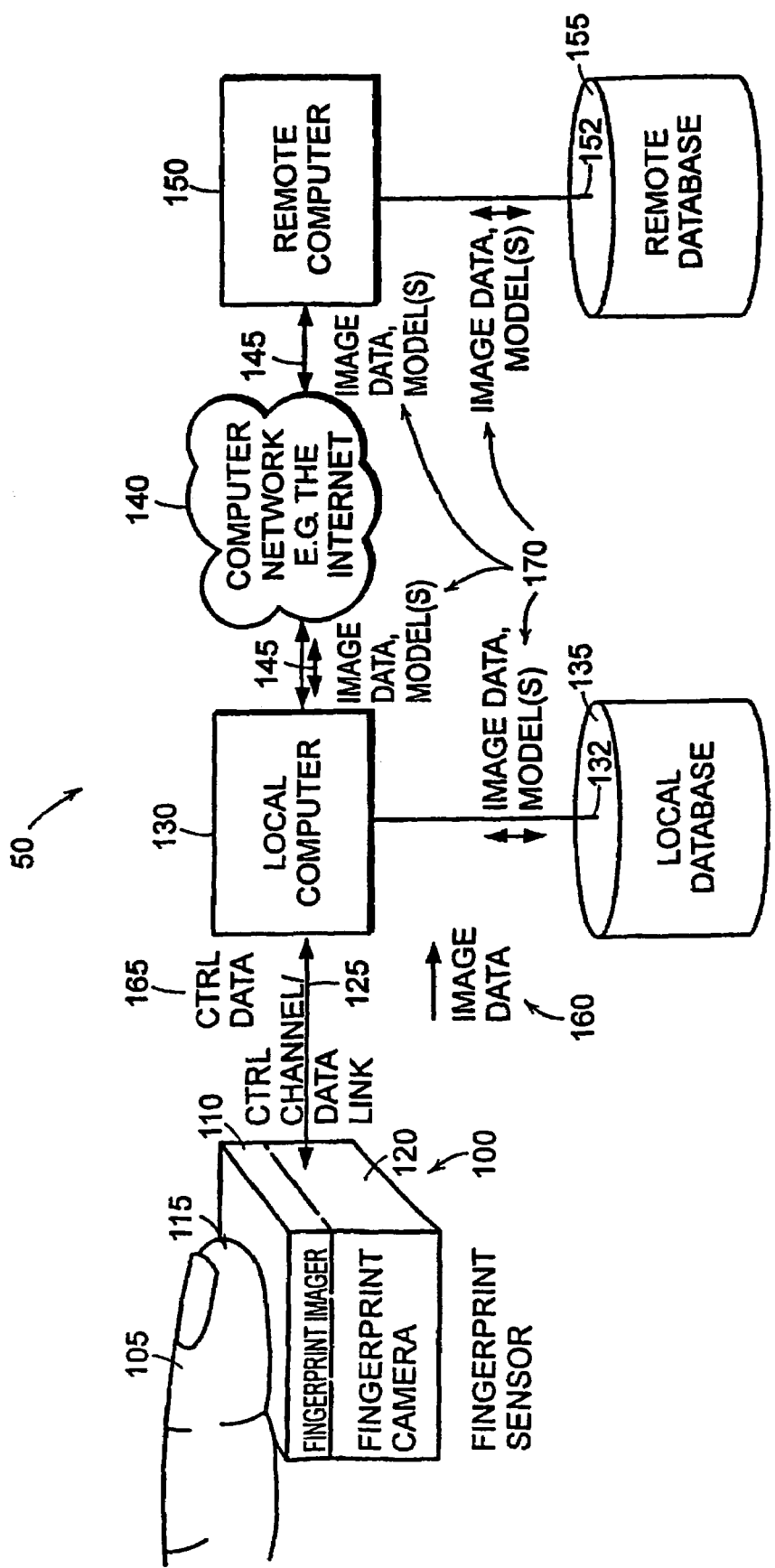
FIG. 1 is a computer network in which a fingerprint sensor according to the principles of the present invention is deployed.

FIG. 1 is a system diagram in which an embodiment of a fingerprint sensor according to the principles of the present invention is employed. The fingerprint sensor 100 includes a fingerprint imager 110 and fingerprint camera 120. The imager 110 and camera 120 may be mechanically, electrically, and optically connected in a single "box." A finger 105 or other topological surface of skin is placed on the fingerprint imager 110 at a "viewable" location by the imager 110 for acquisition of a fingerprint or information of other topological surfaces of skin 115 by the camera 120 and for modeling of the fingerprint 115 by processing as described in co-pending PCT application with U.S. application Ser. No. 10/561,647 filed concurrently herewith on Jun. 21, 2004.

Continuing to refer to FIG. 1, the fingerprint camera 120 includes an interface to communicate bidirectionally with a local computer 130 via a control channel/data link 125. The fingerprint camera 120 sends image data 160 to the local computer 130, and the local computer 130 may send control data 165 or other information, including image data 125, to the fingerprint camera 120 or imager 110 via the link 125.

The local computer 130 includes a variety of processing capabilities, such as modeling, authentication, and authorization that are applied to the image data 160. The local computer 130 is in communication with a local database 135 via a local link 132. Image data and associated model(s) 170, collectively, are communicated between the local computer 130 and local database 135 via the local link 132. Other data, such as administrative data, may also be communicated over the local link 132 for storage in the local database 135 for later retrieval.

The local computer 130 may also communicate with a remote computer 150 via a computer network 140, such as the Internet. The image data and associated model(s) 170 are communicated via network communications links 145 among the local computer 130, computer network 140, and remote computer 150. The remote computer 150 is in communication with the remote database via a remote database link 152.

The remote computer 150 may include some or all of the processing of the local computer 130 or include other services, such as remote retrieval of image data and associated model(s) 170 from a remote database 155 or authentication of a live image of a fingerprint.

For many reasons, it is useful to design the fingerprint sensor 100 in as small a package as possible, such as for use in field operations, security systems, point of sale applications and other applications. However, although packaged in a small size, the fingerprint imager 110 and camera 120 are preferably designed in such a manner as to capture an image of the fingerprint or other topological surfaces of skin 115 in high resolution. One way to achieve a small packaging size is through optical design. For example, the imager 110 may include a Holographic Optical Element (HOE). The HOE allows the fingerprint camera 120 to be positioned close enough to the fingerprint 115 being imaged to detect, without use of large collecting optics or otherwise any imaging optics, image features of the fingerprint 115 as a function of the degree of optical contact between the features of the fingerprint and the surface on which the finger or other topological surface of the skin is placed.

Although a holographic optical element allows for minimizing the size of the fingerprint imager 110 and, consequently, the fingerprint sensor 100, the HOE is generally temperature sensitive, which can affect operation of the optical elements of the sensor. Therefore, compensating for the temperature sensitivity of the HOE is useful for acquiring accurate, high-resolution images of the fingerprint 115. Compensating for the temperature sensitivity of the HOE can be passive or active and is discussed in details below. Alternatively, the HOE and other optical components, if necessary, can be temperature controlled to a constant or suitably narrow temperature range. Any number of methods can be adopted for such temperature control including, for example, use of thermoelectric cooling devices that are available with fully proportional-integral-derivative feedback for closed loop control (second wavelength adsorber within HOE).

Figure 2:
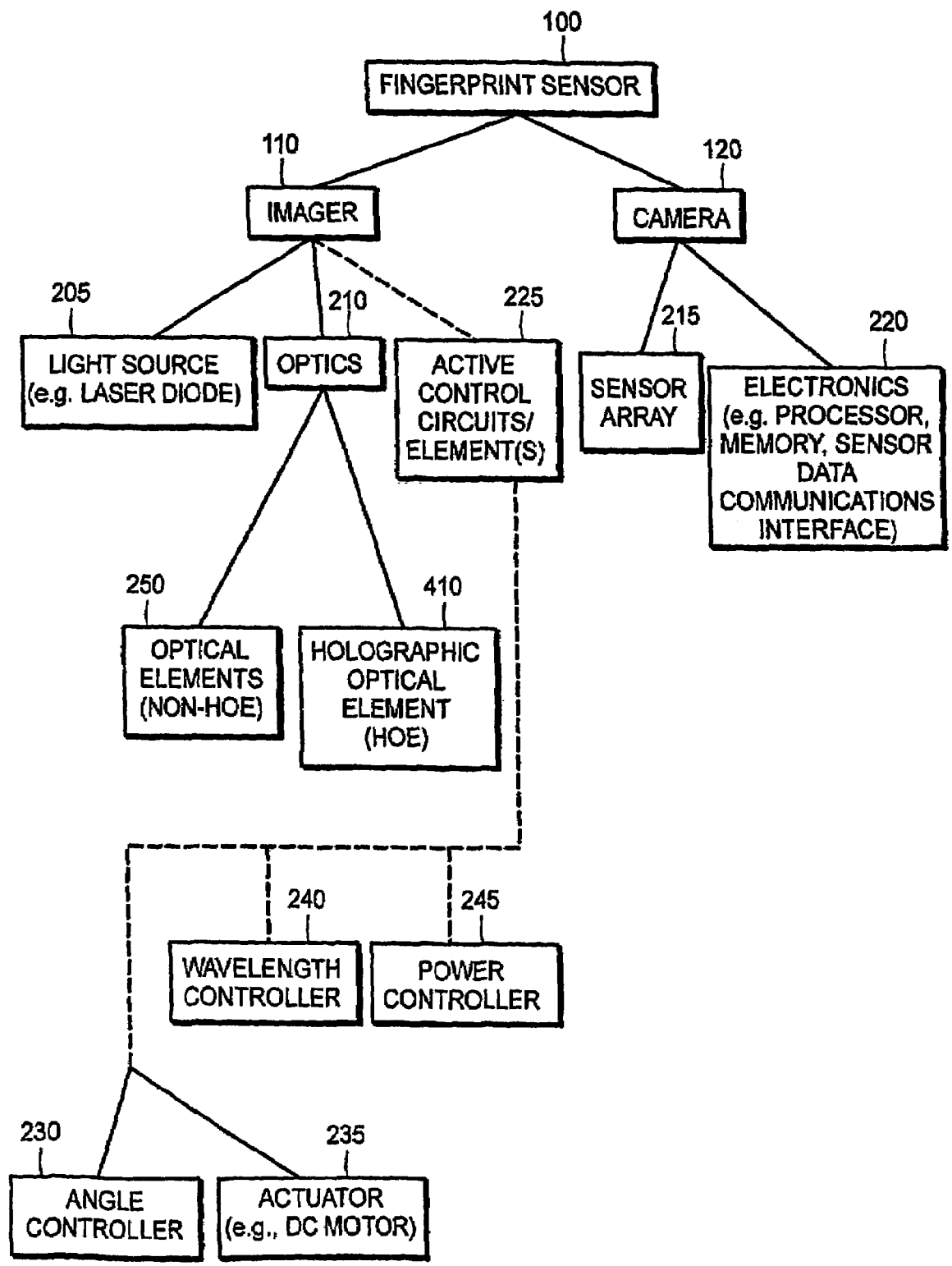
FIG. 2 is a system hierarchical diagram of the fingerprint sensor of FIG. 1.

FIG. 2 is a hierarchical diagram of the fingerprint sensor 100. The fingerprint sensor 100, as discussed in reference to FIG. 1, includes a fingerprint imager 110 and fingerprint camera 120. Each will be discussed in turn.

The fingerprint imager 110 includes a light source 205, optics 210, and, optionally, active control circuits/element(s) 225. The light source 205 may be a coherent light source, such as a laser diode, which works efficiently with a HOE, or may be a non-coherent light source. The optics 210 includes optical elements 250, which are non-HOE's such as a slab waveguide, waveplate, polarizer, and lens(es), and at least one HOE, labeled 255 in FIG. 2, which includes a hologram.

The optional active control circuit/element(s) 225 may include an angle controller 230 and actuator 235. The actuator may be Direct Current (DC) motor, stepper motor, piezo-electric actuator, or other electro-mechanical device capable and adaptable for use in moving the light source 205 to positions and/or at angles fine enough for use in the fingerprint sensor 100. A wavelength controller 240 may also be employed in the imager 110, where the wavelength controller 240 may be used to change the wavelength of the light source 205, which, in turn, can compensate for temperature-induced changes in the angle for the Bragg matching condition of the HOE. A power controller 245 may also be employed by the imager 110 to control the output power and/or wavelength of the light source 205 for controlling exposure levels of the fingerprint 115.

The fingerprint camera 120 includes a sensor array 215 and electronics 220. The sensor array 215 may be a Charge Coupled Device (CCD) or Complimentary Metal Oxide Semiconductor (CMOS) and have a plurality of pixels arranged in a rectangular, or square pattern or other suitable pattern, providing a resolution fine enough for use in the fingerprint sensor 100. The electronics 220 are coupled to the sensor array 215 for receiving pixel data for processing. The electronics may include, by way of example, a processor, memory, A/D conversion, circuitry for variable shutter and/or integration time, and sensor data communications interface.

It should be understood that the hierarchical diagram of FIG. 2 is merely exemplary and could be configured in other ways and include additional or fewer components for implementing the principles of the present invention.

Figure 3:
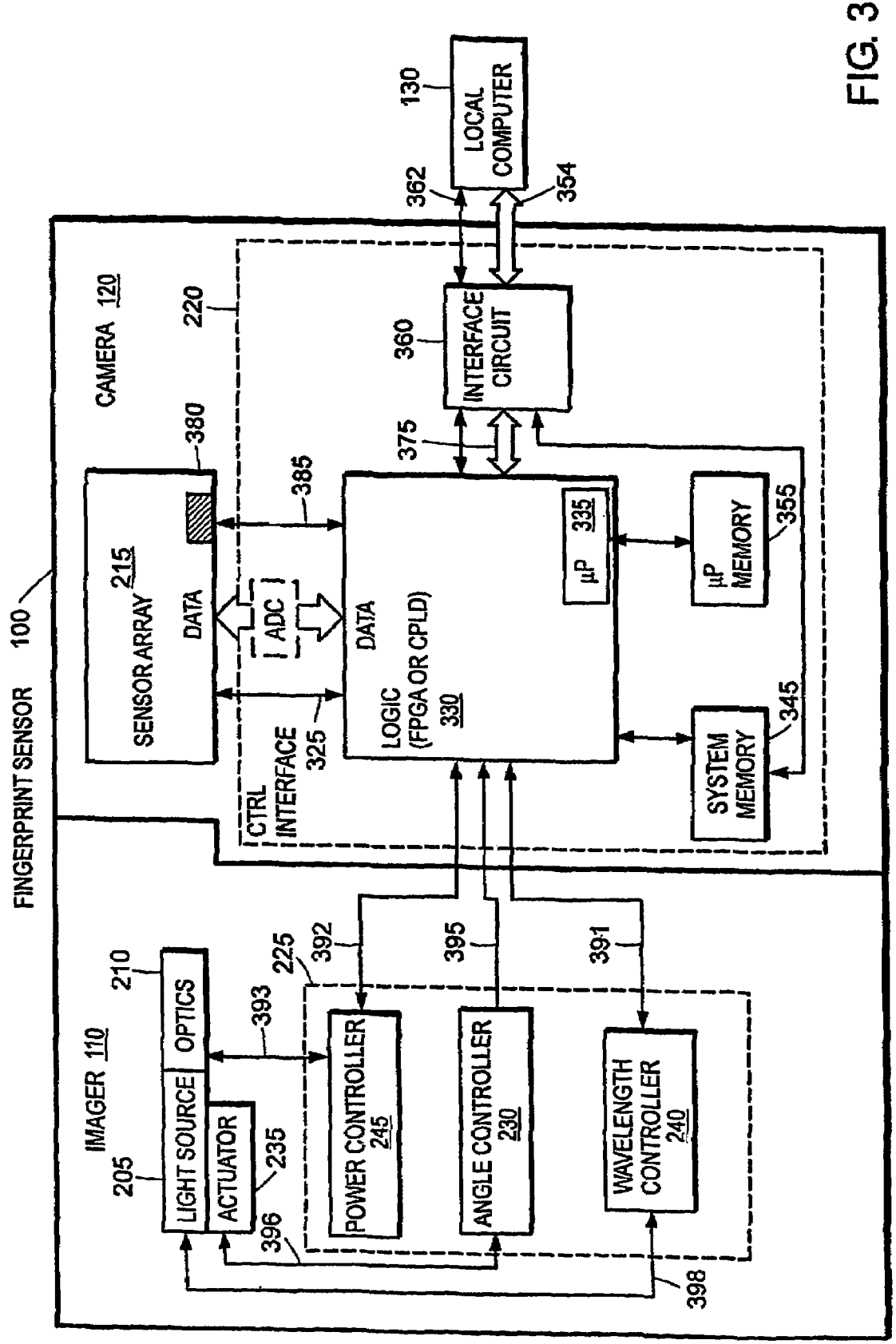
FIG. 3 is a schematic diagram of the fingerprint sensor of FIG. 1.

FIG. 3 is a generalized schematic diagram of the fingerprint sensor and includes a subset of the components introduced in FIG. 2. The imager 110 of the fingerprint sensor 100 includes the light source 205 emitting a light beam that propagates into the optics 210. An actuator 235 may be mechanically connected to the light source 205, directly or indirectly, to steer the light beam into the optics 210 in a controlled angular manner. Active control circuit(s) 225 provide(s) control signal(s) to the actuator 235 and/or the light source 205 in accordance with the descriptions above in reference to FIG. 2. The angle controller 230 of the active controller circuits 225 may provide driving signals 396 to the actuator 235 in order to steer a light beam into the optics 210. The angle controller 230 may receive feedback signals 396 from the actuator 235, or feedback signals 395 from the camera logic 330 for control or regulation purposes. The camera logic may be composed of any collection of electronic processing circuitry that, by way of example, may include one or more field programmable gate arrays (FPGAs), programmable logic devices (PLDs), and/or microprocessors (µP). The power controller 245 of the active controller circuits 225 may provide driving power signals 393 to the light source 205 in order to adjust the light intensity incident upon the optics 210. The power controller 245 may receive feedback signals 393 from the light source 205 or feedback signals 392 from the camera logic 330 for control and regulation purposes. The wavelength controller 240 of the active controller circuits 225 may provide driving signals 398 to control the wavelength of the light emitted from the light source 205. The wavelength controller 240 may receive feedback signals 398 from the light source 205 or feedback signals 391 from the camera logic 330 for control and regulation purposes.

In this embodiment, a feedback signal 391, 392, or 395 or any combination thereof is presented to the active control circuit(s) 225 by the camera logic 330. As in the case of typical feedback control systems, the feedback signals may be generated by the camera logic 330 or by a microprocessor 335 as a function of a difference in actual signal level and a desired signal level corresponding to imaging performance.

For example, in the case of the fingerprint sensor 100, the feedback signal 395 may represent an angular error (i.e. mismatch from the Bragg matching condition of the HOE for light of a particular wavelength incident to the HOE) of the light beam emitting from the light source 205 and projecting onto the topological surface of the fingerprint, which may be caused by temperature effects on the optics 210. The camera logic 330 or microprocessor 335 may determine the feedback signal 395 based on the image data from the sensor array 215. The image data provided by the sensor array 215, for the purposes of feedback control, may include intensity data from a specific pixel in the sensor array, or data from a grouping of pixels in the sensor array or any combination thereof, or said image data used for feedback control may originate from at least one separate and independent sensor 386, providing signal 387 to camera electronics 220 for feedback control, that may comprise a plurality of sensors. The sensor array 215 may contain an additional light sensitive area 380, separate from the array of imaging pixels in the sensor array 215 and comprising one or more pixel, which may provide a signal 385 to the camera electronics 220 for the purposes of feedback control.

The camera electronics 220 may also provide a control signal 325 to the sensor array 215 for use during imaging of the fingerprint features or other topological features of the skin surface. The camera electronics may further include system memory 345 for storing image data following acquisition. The system memory 345 may also provide support for storing image data or partial image data during processing of the fingerprint image. The camera electronics 220 may further include microprocessor memory 355 for supporting the microprocessor 335. The microprocessor 335 and associated memory 355 may be used, for example, for processing the image data or calculating the feedback parameters in order to determine feedback signals 391, 392 or 395 or combinations thereof. Further, the camera electronics 220 may also include an interface circuit 360 for communicating with the local computer 130 via the communications link for transferring the image data 125 and fingerprint sensor control information 165 (see FIG. 1). The interface circuit 360 may communicate directly with the camera logic 330, with the microprocessor 335, or the system memory 345, or any combination thereof.

Figure 4:
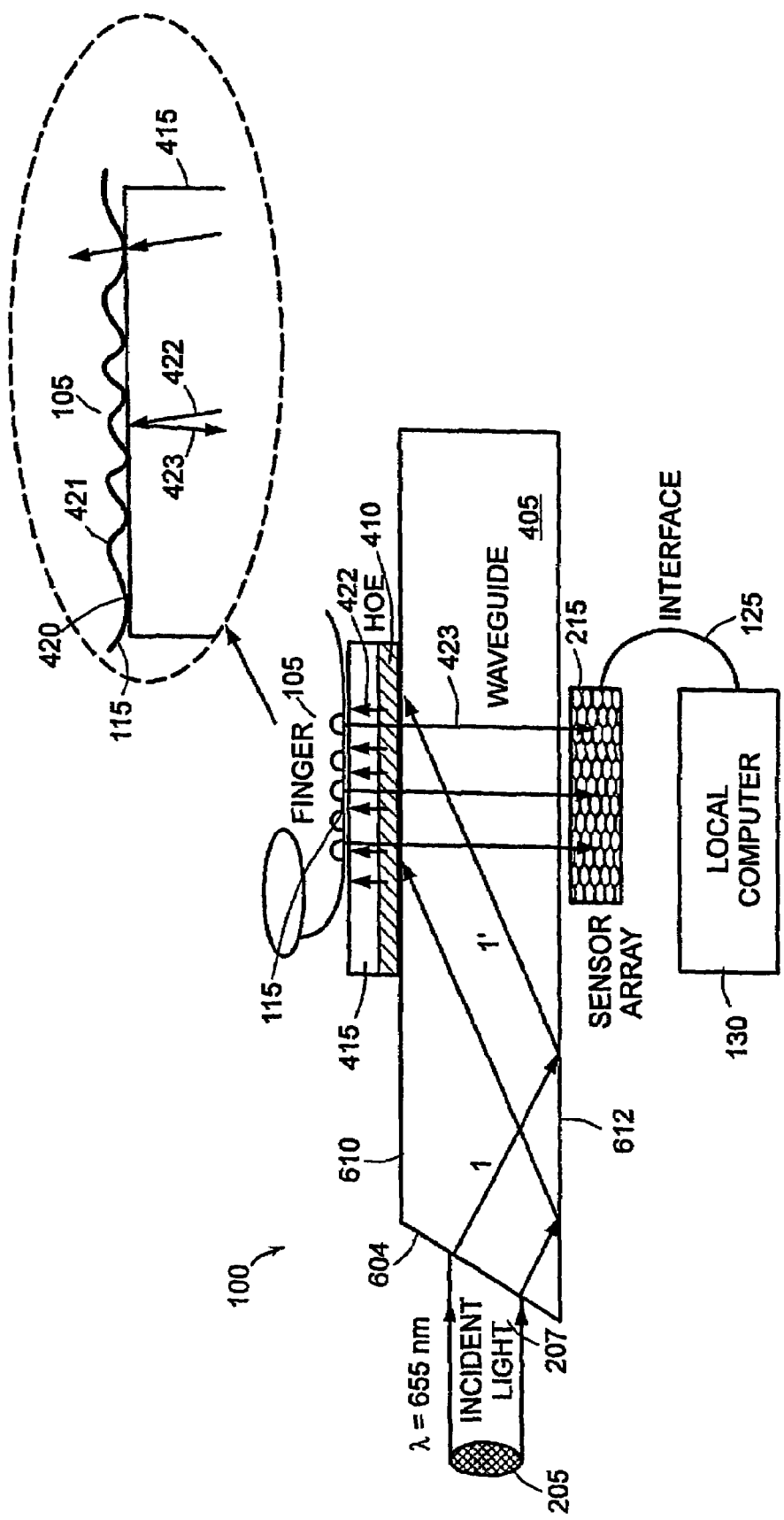
FIG. 4 is a mechanical diagram of an imager in the fingerprint sensor of FIG. 1.

FIG. 4 is a schematic diagram of one embodiment of the device of the present invention. Light source 205 produces a beam of light 207, preferably coherent. The light beam 207 enters a waveguide 405 at an angle relative to entrance edge 604 and refracts towards bottom surface 612 of waveguide 405 and is guided through the waveguide 405 by total internal reflection (TIR) at the substrate-air interfaces such as shown in FIG. 4 by reflection of light path 1 to 1'. The light beam 207 encounters an interface between a Holographic Optical Element (HOE) 410 and waveguide 405, at which point, a portion of the light beam 207 is diffracted by the HOE at a near normal angle with respect to top waveguide surface 610 and travels through cover plate 415 to the surface on which the finger 105 is placed. Referring to inset of FIG. 4, the surface topology of the skin being examined (for example a fingerprint) is labeled as 115. Said skin topology comprises locations 420 that make contact with the top surface of the fingerprint device (in this embodiment the top surface of cover plate 415) and other locations that do not make contact with the top surface of cover plate 415. At locations of non-contact 421, diffracted light 422 is partially reflected at the cover plate-air interface and said reflected light 423 is directed back through the HOE 410, through the substrate waveguide 405, and on to sensor array 215. Reflection at the interface of the cover plate 415 and fingerprint 115 is suppressed at locations 420 where topological portions of the skin surface, such as ridge structure of the fingerprint, come into optical contact with the cover plate. Such topological portions that contact the cover plate are not limited to ridge structure of the fingerprint, but instead may comprise ridge structure of the palm, thumb, toe, other skin surface, etc. The remaining reflected light arising from these locations, such as diffuse reflected light from the topological surface features of the skin surface in contact with cover plate 415, carries an image of these contact areas to the camera 120.

It should be understood that while the embodiments of the devices of the present invention, such as the one shown in FIG. 4, show waveguide 405 having parallel top and bottom surfaces 610 and 612, other embodiments are envisioned. For example, in one embodiment, the waveguide can comprise a curved surface. The curved surface may be a cone, and a subject whose palm print is taken places his or her palm wrapped around the outer surface of the cone. In another embodiment, the waveguide is a cone having an inner surface accessible and a subject placing his or her finger in contact with such inner surface. Accordingly, as used herein, the term "top waveguide surface" generally refers to the skin-proximal surface of the waveguide, i.e. the surface in contact with skin. As used herein, the term "bottom waveguide surface" refers to the sensor array-proximal surface of the waveguide, i.e. the surface opposite to the skin proximal surface.

Figure 5:
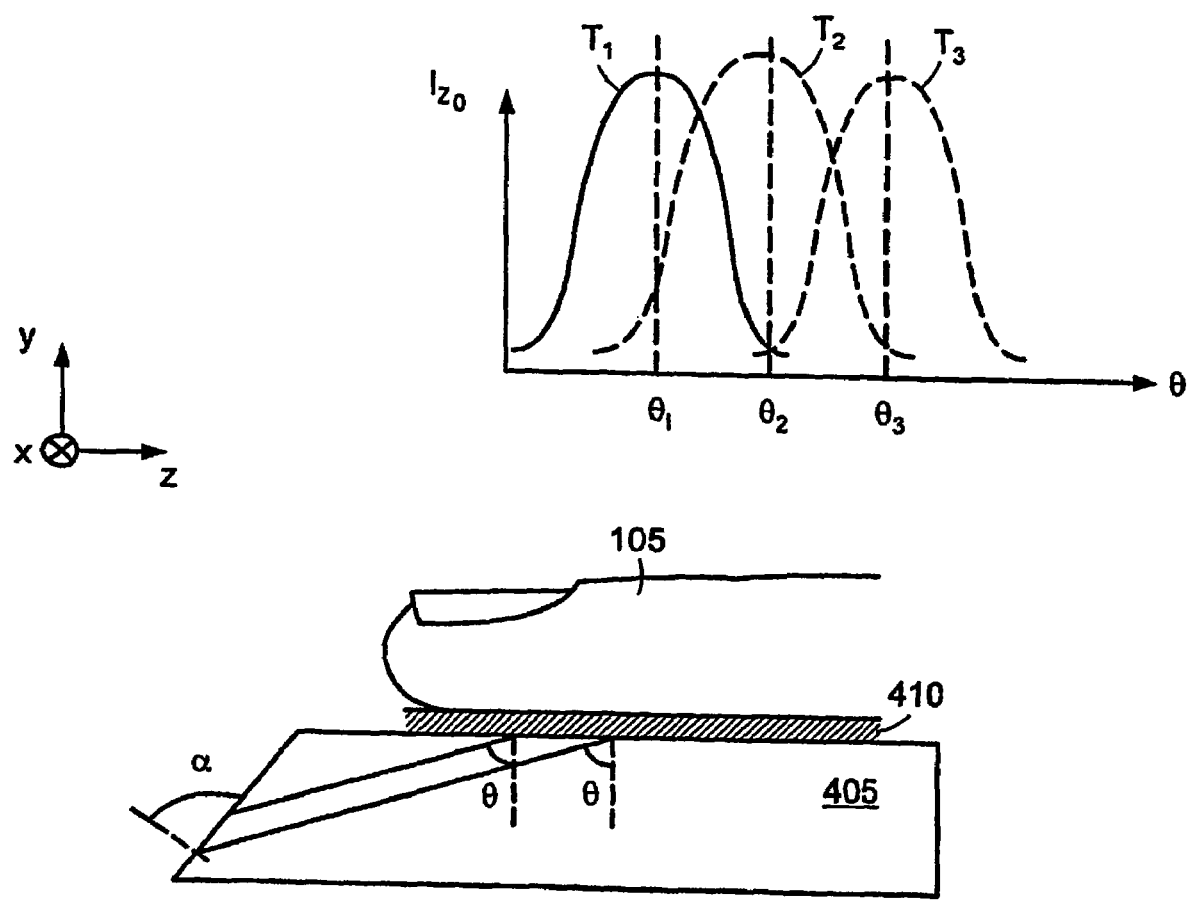
FIG. 5 is a diagram of the imager of FIG. 4 with a graph illustrating peak intensity changes of diffracted light as a function of temperature.

Use of holographic optical elements (HOE) that comprise a photopolymer recording media attached to at least one support layer allows for a compact design without sacrificing resolution. However, certain important characteristics of the holographic optical element are very temperature sensitive. For transmission holograms, such as illustrated in FIG. 5, the fraction of light diffracted by the hologram depends both on the wavelength of the light, and its angle of incidence θ at the interface between HOE 410 and waveguide 405. Adequate diffraction efficiency occurs only in narrow wavelength and angular ranges that are determined by the angles of the recording conditions for the HOE, the thickness of the hologram medium, and the wavelength of the light used for recording the HOE (collectively determine so called Bragg selectivity or Bragg matching condition), and the wavelength of the light used to reconstruct the HOE. Without appropriate adjustments to the wavelength or incident angle, temperature changes of only a few degrees will significantly reduce or even eliminate holographic diffraction of a single hologram due to the effect of temperature on the refractive index of the hologram, the grating spacing and the grating angle.

Referring to FIG. 5, the intensity of diffracted light at temperature $T=T_1$ has a peak at an incident angle $\theta_1$ to the HOE for a specific wavelength $\lambda_1$. As temperature changes from $T=T_1$ to $T=T_2$ to $T=T_3$, the peak of intensity of diffracted light at a fixed location along the z-axis shifts from an incident angle $\theta_1$ to an incident angle of $\theta_2$ to an incident angle $\theta_3$, for a fixed incident wavelength $\lambda_1$. As a result, intensity of light diffracted to a fixed location $z_0$ along the z-axis decreases, thus significantly degrading the signal-to-noise (SNR) ratio. Similarly as temperature changes from $T=T_1$ to $T=T_2$ to $T=T_3$, the peak of intensity of diffracted light shifts from use of a wavelength $\lambda_1$ to $\lambda_2$ to $\lambda_3$ for the same incident angle $\theta_1$. A practical device for use in the field must either eliminate operating temperature variations, or compensate for temperature changes by changing the incidence angle $\theta$ of the light beam 1, or the wavelength or both, or provide for simple and fast alignment of angle $\theta$.

Accordingly, in one embodiment, the present invention is an apparatus for acquiring a fingerprint that compensates for operating temperature variations by automatically changing incidence angle (either $\alpha$ or $\theta$ in FIG. 5) or wavelength of the propagating light to maintain adequate SNR at the sensor array.

Referring to FIGS. 6A and 6B, one embodiment of the device of the present invention is shown. A light source, such as a laser diode, 205 is positioned in front of a lens element 602, preferably at the focal point of lens element 602 (located a distance from lens element 602), which in turn is held by mounting means 606 in front of entrance edge 604 of waveguide 405. As used herein, the term "lens element" refers to one or more elements having optical power, such as lenses, that alone or in combination operate to modify an incident beam of light by changing the curvature of the wavefront of the incident beam of light. Lens element 602, for example, can comprise more than one lens.

Both light source 205 and lens element 602 are mounted relative to platform 662. As the temperature of the fingerprint sensor changes from $T=T_1$ to $T=T_2$, the grating period, grating slant angle, and average index of refraction of HOE 410 will change and, additionally, the index of refraction of the material comprising waveguide 405 will change. Consequently, for a specific read wavelength $\lambda_1$, the required angle of incidence with respect to the surface normal 605 of the entrance edge 604 will change from $\alpha_1$ to $\alpha_2$ so as to maintain peak diffraction efficiency of the HOE 410 when temperature T changes from $T=T_1$ to $T=T_2$. To alter the incident angle one can choose length and thermal expansion coefficient of mounts 606 and 608 so that the relative difference in heights (in the y-axis) of the center of the lens element 602 and the center of the light source 205 change so that the incident angle of beam 207 changes from $\alpha_1$ to $\alpha_2$ at entrance edge 604 when T changes from $T=T_1$ to $T=T_2$. It may be shown that the following relationship for holds true:

$$\alpha_2 - \alpha_1 = \frac{CTE_d L_1 - CTE_l L_3}{f} \Delta T, \quad (1)$$

where $\Delta T=T_2-T_1$, and $CTE_d$ and $CTE_l$ are the coefficients of thermal expansion for the light source (e.g., laser diode) mount and for the lens mount, respectively.

It is understood that a material that expands as temperature increases preferably also contracts as temperature decreases or vica versa. Thus, as used herein, the term "thermally expandable" means changing volume or length with temperature.

Alternate embodiments of this general concept include, but are not limited to, translating the lens element 602 in the y-direction, tilting waveguide 405 in the y-z plane, and/or moving and tilting a light source 205 provided that light source 205 outputs a collimated beam. In this latter embodiment, lens element 602 is integrated into the light source 205. These motions can all be achieved automatically via temperature induced changes in the dimensions of the structural elements that form the mechanical mounts for these optical components. These motions can be performed in any combination and those skilled in the art will be able to choose proper materials and dimensions for said mechanical mounts.

Figure 6C:
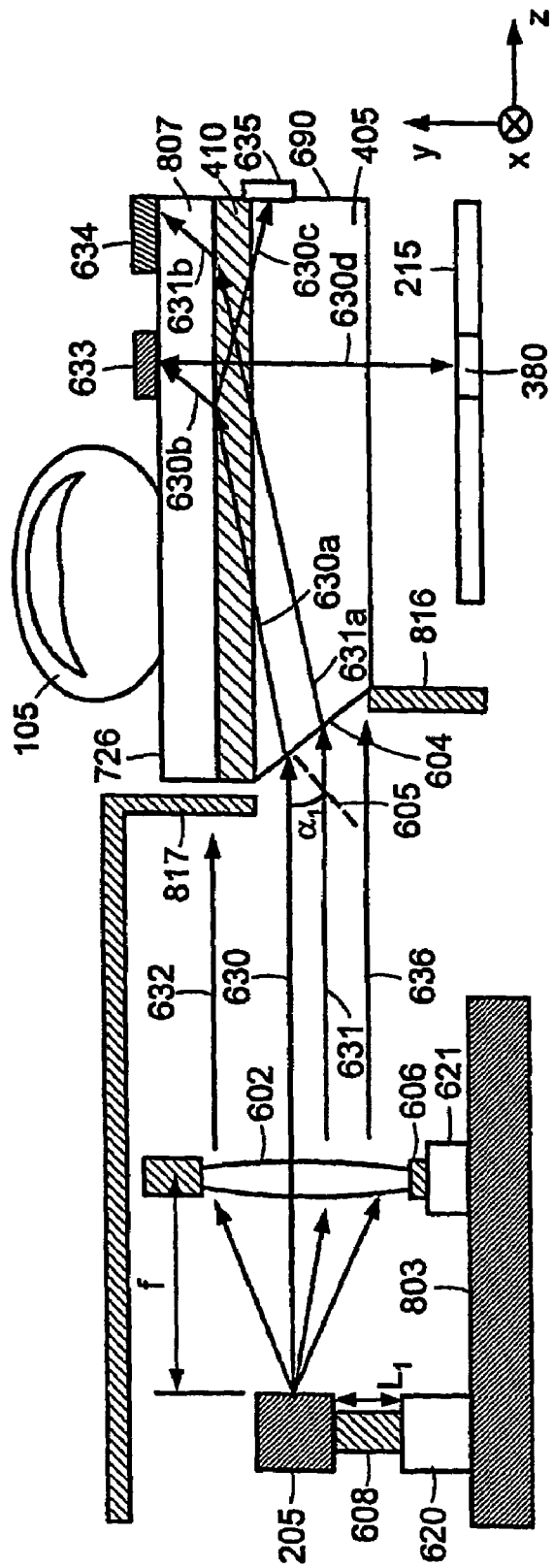
Figure 6C:
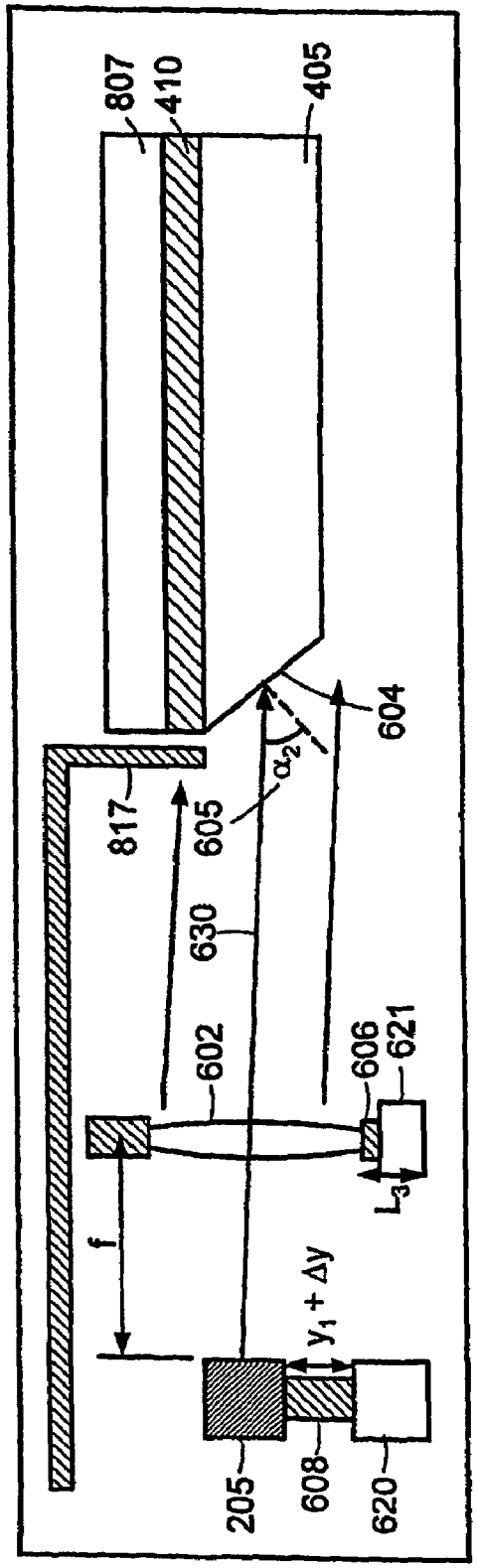

Referring back to FIG. 3 and to FIG. 6C and the inset, the fingerprint apparatus of this invention further comprises an electronically controlled actuator 390, such as a motor, that can be used to adjust the angle of incidence $\alpha$ by changing the vertical position of the lens element 602 with respect to the optical axis of light source 205, or by changing the vertical position of the light source 205 with respect to the optical center of lens element 602, such as shown in FIG. 6C inset by vertical translation of the light source to a height position of $y=\Delta y$ at $T=T_2$. As depicted in FIG. 6C, the electronic actuator is represented by two separate motors 620 and 621 that drive the laser source 205 and the lens element 602, respectively in the y-direction to accommodate changes in incident angles at the entrance edge 604. There is a number of means by which the signal to drive the actuator can be obtained by one skilled in the art, and the methods depicted in FIG. 6C and its inset are intended to be illustrative but not limiting. In particular, it is desirable to use light diffracted by the hologram as the feedback source, since local temperature changes due to contact with the finger or changes in the ambient temperature can thus accounted for.

For example, light ray 630 can refract into the waveguide to become light ray 630a. When light ray 630a diffracts in HOE 410, the diffracted beam 630b propagates at near normal-incidence to surface 637 and encounters reflective surface 633, at one or more locations on the skin contact layer 807, that reflects the light such that ray 630d is incident upon dedicated pixels 380 of sensor array 215. Alternatively, ray 630d can be directed to a separate sensor array or to a separate detector, such as a photodiode, specifically included for this purpose. Referring to FIG. 6C, the feedback of the signals from pixels 380 or other sensor array or detector can then be used to tune the incident angle $\alpha$ of the system. Alternatively, or in conjunction with this embodiment, the non-diffracted portion of the light ray 630a is reflected at the interface of HOE 410 and skin contact layer 807 and directed towards a detector 635 positioned on or near edge 690 of the waveguide. In still another embodiment, a light ray 631 incident upon entrance edge 604 is refracted into light ray 631a that diffracts at HOE 410, wherein the intensity of diffracted beam 631b is monitored by detector 634. The signals from detectors 634 and 635, as with the signal from detector pixels 380, can be monitored and used to optimize the performance of the optical system. This ensures that despite temperature fluctuations of the fingerprint sensor, the HOE remains Bragg-matched to the light source 205. In one embodiment, signals from reflection of the diffracted and nondiffracted portions of light ray 630b and 630c can be monitored by separate detectors and the difference signal normalized to the sum signal can be obtained to provide feedback information for both the magnitude and direction of adjustment, relative to a set point, that is required to compensate for temperature changes. In another embodiment, the intensity of the diffracted light that is incident upon skin contact layer 807 at other locations that are outside the area of the skin surface being examined, can also be monitored by placement of a detector at these other locations or at positions where the specularly reflected light from these other locations can be detected. The intensity of the undiffracted light may be monitored at different locations where its path of internal reflection is terminated by the presence of another surface, such as edge 690 of waveguide 405.

Figure 7A:
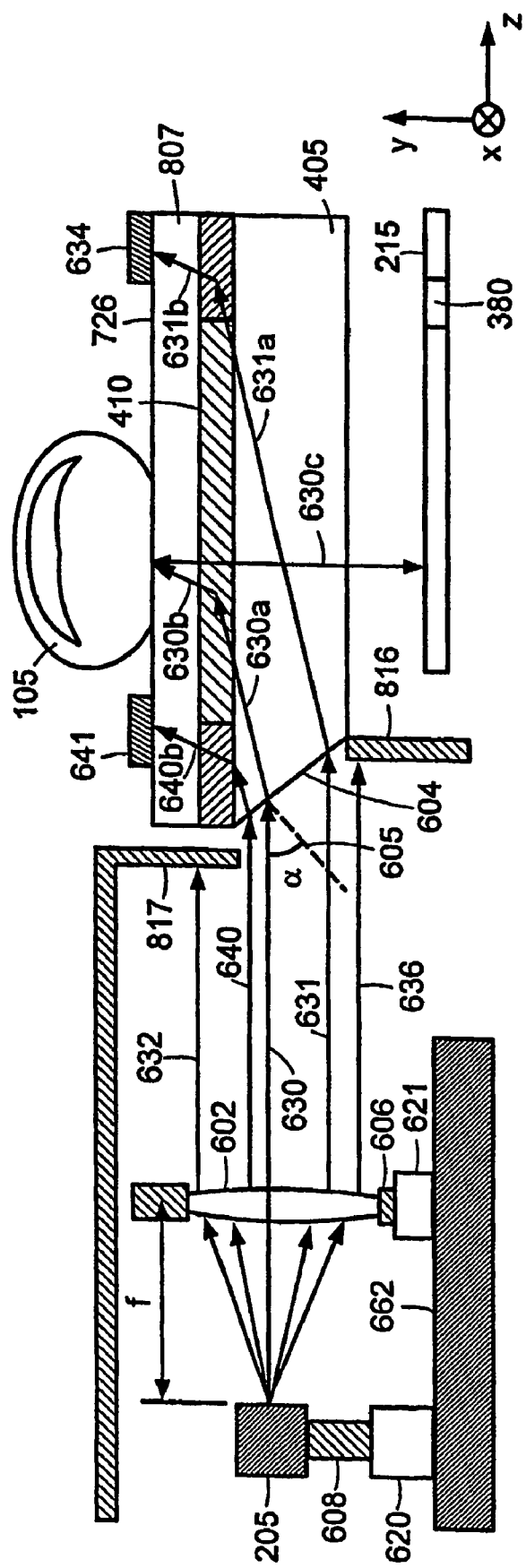
FIG. 7A is a mechanical diagram of another embodiment of the imager of FIG. 1 including means for optically detecting temperature changes.

Alternatively, a second hologram, as well be detailed further in reference to the description of FIG. 7A, included specifically for the purpose of generating a servo feedback signal, can be recorded so as to be located in the vicinity of the main hologram of HOE 410. In one embodiment, this second hologram can be co-located with the main hologram by being co-locationally multiplexed.

Figure 6D:
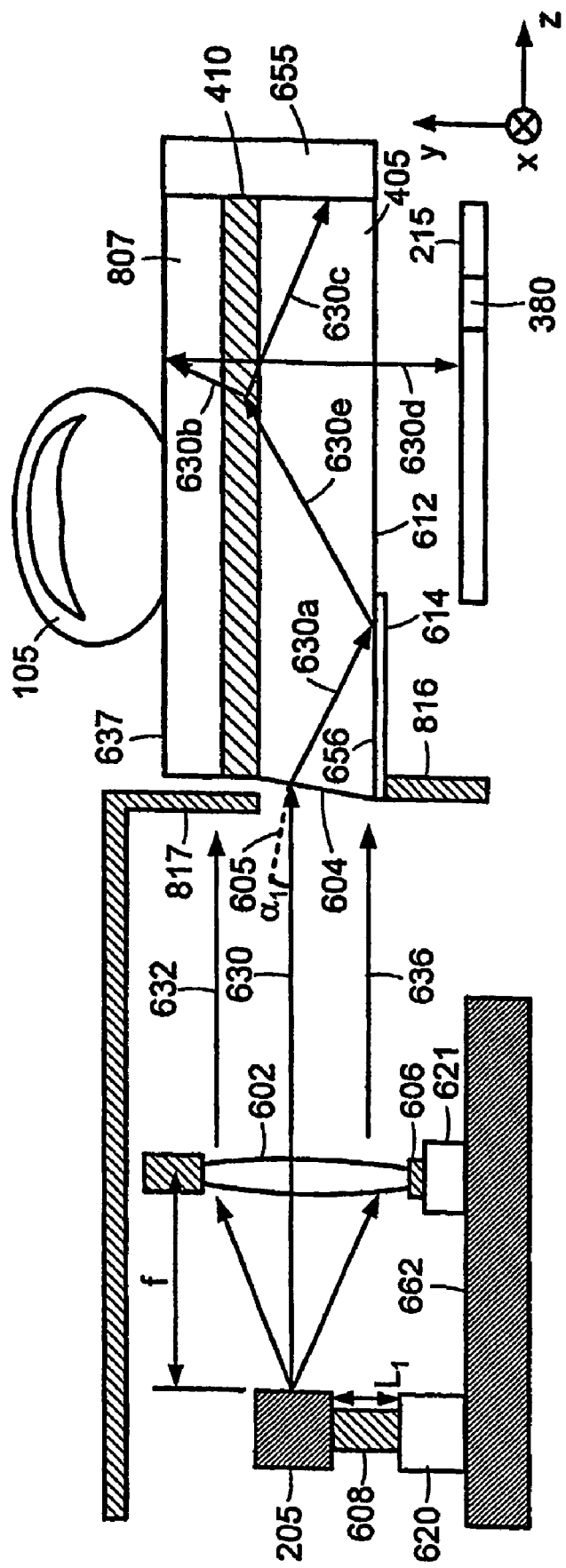

Referring to FIG. 6D additional embodiments of the device of the present invention are shown. Specifically, entrance edge 604 is designed so that the incident ray 630 refracts as ray 630a towards bottom surface 612 of the waveguide 405. A portion of bottom surface 612 of waveguide 405 can be coated with a reflective layer (e.g. metal coating) labeled 614. Reflective layer 614 operates to protect waveguide 405 from smudges and other defects or contamination that may arise on bottom surface 612. These defects, if present, can add aberrations and regions of non-uniform beam intensity in the reflected beam 630e, such as by suppressing total internal reflection at locations of the defects, thereby possibly compromising the quality of the image collected by sensor array 215. It is preferable that reflective layer 614 only extend as far as would be required to protect the area of the first reflection of the incident light at surface 612. The extent of reflective layer 614 the z-direction should not block rays such as ray 630d from reaching sensor array 215.

In another embodiment waveguide 405 includes light traps 655 at edge 690, see FIG. 6D. Light traps 655 are designed to absorb substantially all of the light incident upon edge 690 and allow a minimum of light to reflect at edge 690. Suppressing such reflections (for example ray 630e that is undiffracted by HOE 410) minimizes the amount of spurious light that may illuminate the skin topology under examination and/or the amount of spurious light that is incident upon sensor array 215, which would otherwise reduce the SNR of the fingerprint system.

Figure 6E:
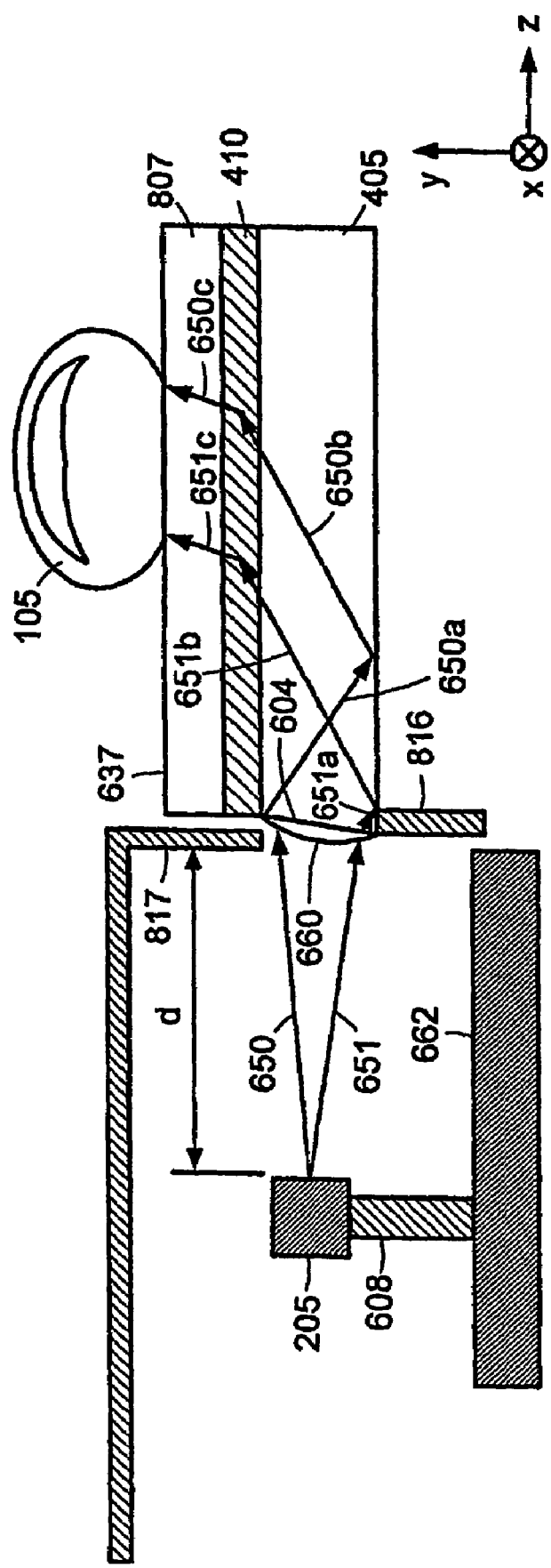

In another embodiment, shown in FIG. 6E, entrance edge 604 operates with optical power to optimize illumination of the location of the hologram of HOE 410. In FIG. 6E, entrance edge 604 as shown includes optical element 660. In this embodiment, lens element 602 (see FIGS. 6A-6D) can be eliminated. By way of example, optical power of entrance edge 604 can be designed to provide optimal illumination of HOE 410 for light sources 205 such as laser diodes that operate to output light with a certain divergence angle range $\theta_s$.

Different algorithms can be used to implement the control of actuator 390 (see FIG. 3). Proper selection of a method of temperature compensation that is particularly suitable for a fingerprint apparatus and the computer control thereof will be obvious to one skilled in the art. By way of example, it is sufficient to set an angle of incidence $\alpha$ once at a known temperature during an initial calibration of the apparatus. Then the actuator control can be instructed to move an element under its control in one direction in response to temperature-induced changes in the Bragg matching condition of the HOE and corresponding changes in the intensity of the diffracted light and illumination of sensor array 215 (see FIG. 4 and FIG. 6C). If illumination is decreasing, then the direction of movement of the actuator can be reversed to find the optimal angle $\alpha$ corresponding to maximum diffraction efficiency for the HOE. Once the detected intensity has traversed through a peak as a function of adjustment of angle $\alpha$, then the actuator can be returned to the position that corresponded to the peak value of the detected illumination. Alternatively, if continuous compensation is preferred, then the actuator can be dithered back and forth traversing across the peak value of the detected intensity. In this manner the described algorithm controls the actuator so as to continually reverse direction as it crosses the peak value of detected illumination. It is preferable that dither amplitude be controlled such that the resulting intensity changes detected at the sensor array are sufficient for detection, but not so large that they deleteriously affect the SNR of the acquired fingerprint image.

Figure 7B:
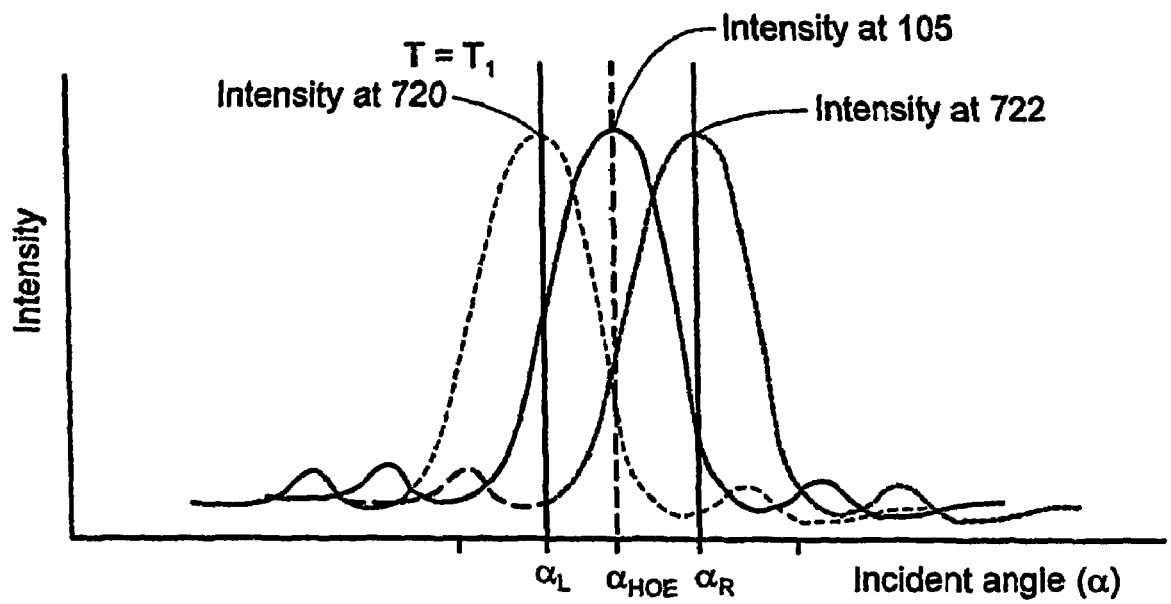
FIGS. 7B and 7C are waveforms illustrating optical feedback in the imager of FIG. 7A.
Figure 7C:
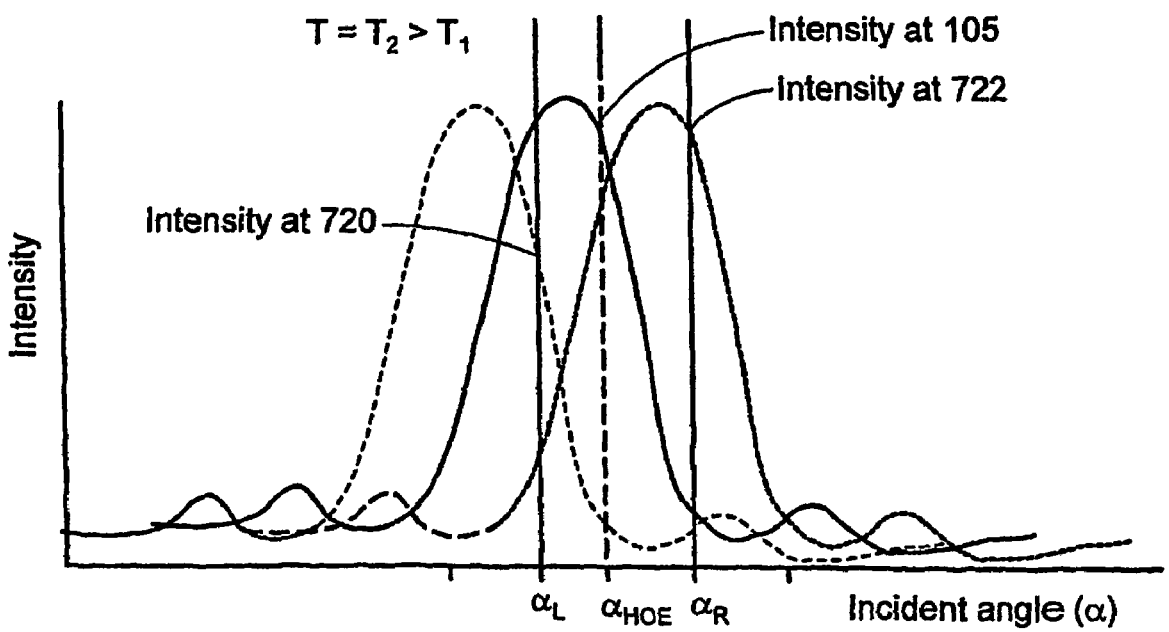

In one embodiment, additional holograms are used to control the actuator. In one embodiment, shown in FIG. 7A, two additional holograms 702 and 704 are disposed at or near HOE 410. Holograms 702 and 704 are recorded so that their peaks of angular Bragg selectivity are shifted in opposite directions with respect to the angle for Bragg matching HOE 410 ($\alpha_{HOE}$), as shown in FIG. 7B, and correspond to incident angle $\alpha=\alpha_L$ and $\alpha=\alpha_R$ for holograms 702 and 704, respectively. Light beams diffracted from holograms 702 and 704 are detected by two dedicated sensors 720 and 722, respectively, or by dedicated areas of sensor array 215 (not shown). The dedicated sensors 720 and 722 are disposed (or the locations of dedicated areas of sensor array 215 are selected), by way of example, so as to be located at positions along the z-axis to independently detect the intensity of light diffracted by holograms 702 and 704, respectively. Sensors 720 and 722 can be located to detect the intensity of light diffracted by holograms 702 and 704 or instead to detect the intensity of the diffracted light from said holograms after the diffracted light has reflected at top surface 726 of skin contact layer 807. Preferably, although not a requirement, $\alpha_L$, $\alpha_{HOE}$ and $\alpha_R$ are adjusted so that the intensities of light beam diffracted by hologram 702 and 704 and detected by the respective dedicated sensors are substantially equal at the values of incident angles for the Bragg matching condition of the respective holograms (shown as equal height peak in FIG. 7B). As can be seen from FIG. 7B, $\alpha_L < \alpha_{HOE} < \alpha_R$. As the result, as shown in FIG. 7C, when the angle for the Bragg matching condition of HOE 410 and holograms 702 and 704 changes due to temperature changing from $T_1$ to $T_2$, the dedicated sensors 720 and 722 will detect intensity of light beams diffracted from holograms 702 and 704 that are different from the respective intensities detected at temperature $T_1$ for the same angle of incidence $\alpha$. The difference in intensity can be used to compute the control signals 393 or 396 or 398 or combinations thereof. It should be understood that logic 330 is designed to receive signals from the dedicated areas for processing differences in intensities.

An alternative embodiment comprises use of multiplexed holograms recorded in the photopolymer media of the HOE. The multiplexed holograms are recorded so that the Bragg selectivity's of these holograms are substantially overlapping. Use of multiplexed holograms that are recorded co-locationally can significantly reduce the sensitivity of the apparatus of this invention to temperature changes, or alignment changes, or wavelength changes, or combinations thereof. The multiplexed holograms, by way of example, can be multiplexed by the method of planar-angle multiplexing in a manner such that the increment of the recording angle is less than the width of the Bragg selectivity of each multiplexed hologram. Alternatively, these holograms can be multiplexed by varying the interbeam angle or the wavelength such that the grating period of each multiplexed hologram is slightly different so that the angular or wavelength selectivity characteristics of one such holograms is partially overlapped with another. The optical convolution of the multiplexed holograms provides a broadened detuning characteristic for the HOE for angle or wavelength, such that the diffraction efficiency of the element is more uniform when changes in wavelength, alignment, or temperature occur. This type of holographic element is advantageous compared to when the Bragg selectivity is broadened by the approach of over modulation. Alternatively, thinner holograms can be used to broaden the angular selectivity characteristics.

In an alternative embodiment, changing the wavelength of the light generated by a light source, while maintaining a constant incident angle α, can compensate for temperature-dependent changes in the Bragg condition of the HOE. In the embodiments that utilize laser diode as light source 205, wavelength changes can, by way of example, be effected by changing the operating conditions of a laser diode, such as by changing the level of the driving current for the laser, or the operating temperature of the laser, or by temperature sensitive wavelength filtering of a multi-wavelength light source such as a LED. Possible wavelength filters include, but are not limited to, holographic optical elements whose properties will change in concert with the properties of the hologram of the waveguide.

Referring again to FIG. 3, an embodiment of the fingerprint sensor 100 that can effect the wavelength change may utilize wavelength controller 240 to adjust the operating condition of the laser diode light source 205. The wavelength controller 240 may adjust the operating current of the laser diode in order to change the operating wavelength of the laser light source 205. Alternatively, the wavelength controller 240 may drive a heater or cooler element (not shown) in order to change the operating wavelength of the laser diode light source by way of controlling the operating temperature of the laser diode. The feedback signals provided for controlling the operating wavelength of the laser diode may originate, for example from a thermocouple device attached to the laser diode. Alternatively, the feedback signals may originate from selected pixels, groups of pixels, or other light sensitive areas 380 on the detector array 215, or any combination thereof. In the case of the aforementioned embodiment, the feedback signals that indicate light intensity decreasing on the detector array may be processed by the camera logic 330 or the camera microprocessor 335 in order to determine the correct operating wavelength to drive the wavelength controller 240.

In other embodiments, rather than changing the wavelength, a light source that has a broader wavelength spectrum can be used to reduce the sensitivity of the Bragg angle of the HOE to temperature change. Such light sources may include, for example, an LED or superluminescent LED. In these embodiments the incident angle α is held constant. As long as changes of the Bragg wavelength, produced by temperature changes of the HOE, are within the spectral bandwidth of the light source there will be a sufficient intensity of diffracted light to produce good imaging.

Other embodiments of the apparatus of this invention relate to physical construction of the device and will be described with reference to FIG. 6A. In one embodiment, entrance edge 604 of waveguide 405 forms an oblique angle to the top and bottom surfaces 610 and 612, said surfaces 610 and 612 being substantially parallel and planar surfaces. Use of an oblique angle for the entrance face of the waveguide advantageously reduces the thickness requirement for said slab waveguide. For example, with use of oblique angle for the entrance face, light beam 630 can be refracted directly towards top surface of waveguide 610 rather than towards bottom surface of waveguide 612 as it does in FIG. 6D. Refracting incident light 630 directly towards top surface, thereby eliminating the total internal reflection condition that is otherwise required for bottom surface of waveguide 612, reduces the z-dimension of waveguide 405. Alternatively, waveguide 405 can comprise inner and outer surfaces that may be curved so that a large topological surface of the skin can be placed on the outer surface at one time and imaged, such as could be the case when imaging the topological features of the surface of a palm. Again, use of an oblique angle for the entrance facet of the waveguide advantageously reduces the thickness requirement for said waveguide.

Figure 8A:
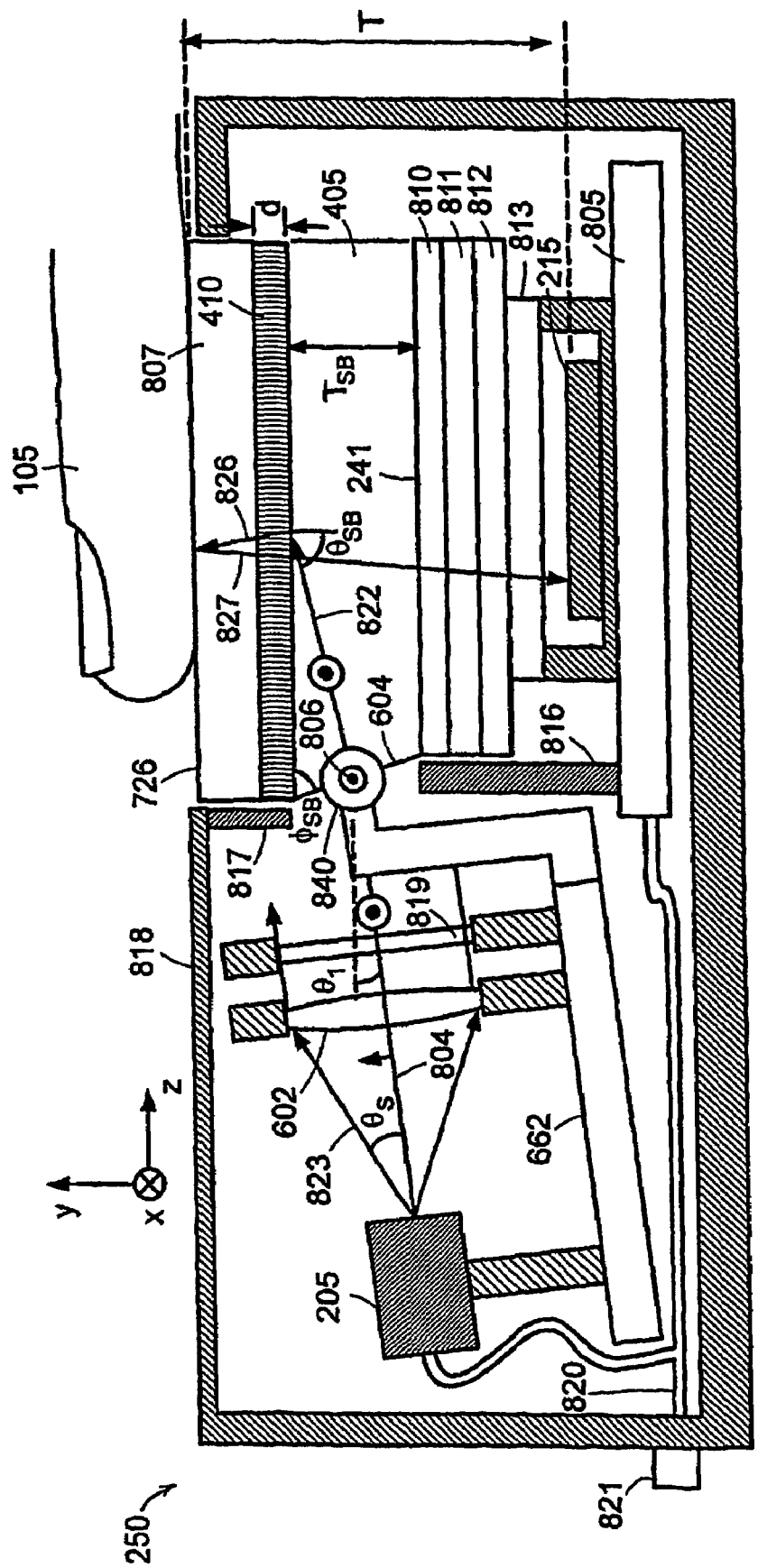
FIGS. 8A-8D are mechanical diagrams of other alternative embodiments of the imager in the fingerprint sensor of FIG. 1.

Other embodiments of the apparatus and method of this invention relate to the hologram recorded in the photopolymerizable media of the HOE. Referring to FIG. 8A, the apparatus of this invention preferably comprises HOE 410 that diffracts light (beam 826) in a direction that is not perpendicular to skin contact layer 807 so that the light reflected at the interface of skin contact layer 807 with air will not be diffracted by HOE 410 on the return path toward the imager (ray 827). More preferably, HOE 410 diffracts light in a direction that differs from the perpendicular direction by an angle that exceeds the angular width of the Bragg selectivity of the HOE, but said angle is additionally as close to perpendicular as possible in order to minimize distortions in the imaged fingerprint by keeping the optical path length (OPL) from the skin to the sensor as short as possible. A preferred diffraction property of the HOE can also be achieved with multiplexed holograms or with overmodulated holograms providing for both the preferred angle of the diffracted light and also the preferred broadened angular selectivity of said hologram.

Another aspect of the apparatus and method of this invention, is that HOE 410 comprises one or more holograms that operate as a holographic grating to redirect the light from waveguide 405 towards the finger in a direction that differs from the perpendicular direction by an angle that exceeds the angular width of the Bragg selectivity of the one or more holograms, and that said hologram(s) is also formed to operate with a diffraction efficiency of at least 10%, more preferably at least 50%, even more preferably at least 75%, and most preferably greater than 90%.

In the embodiment shown in FIG. 8, a ½ wave plate 819 is included between light source 205 and entrance edge 604 of waveguide 405 to rotate the plane of polarization of the light beam such that the polarization is matched to the polarization that HOE 410 is tuned to while at the same time providing optimal illumination of entrance edge 604 of waveguide 405. Half-wave plate 819 can be tilted on an axis perpendicular to the optical axis of the incident light in order to provide an effective optical thickness or optical path length (OPL) for phase change that is increased if necessary to be optimal for the wavelength of light source 205.

Figure 8B:
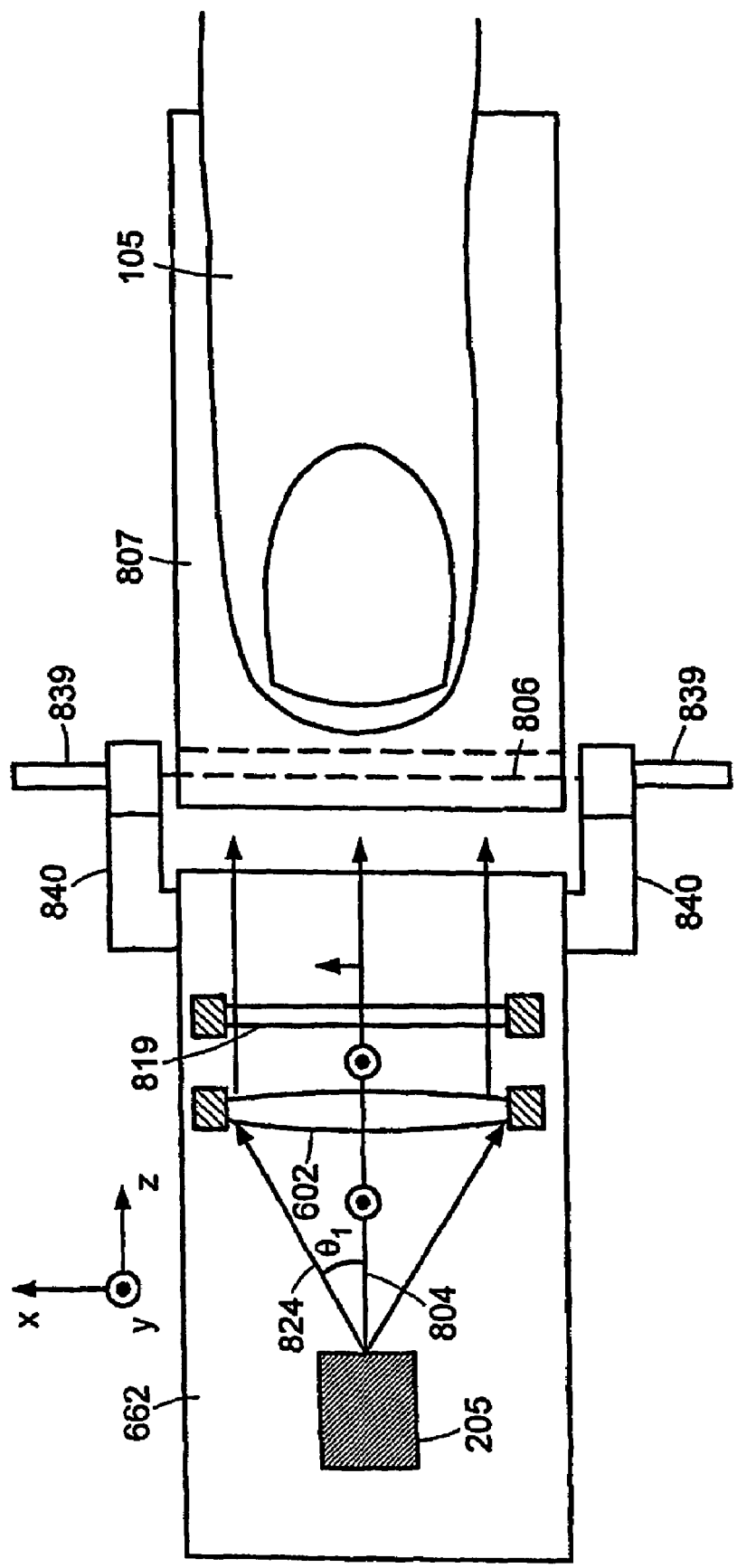
Figure 8C:
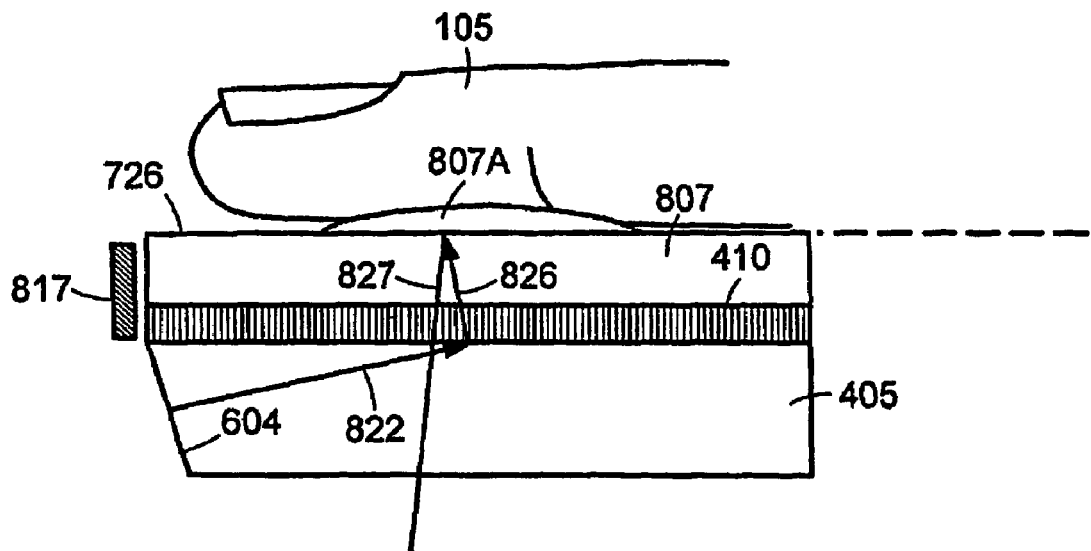

In another embodiment, shown in FIG. 8C, skin contact layer 807 comprises a curved layer 807A that, by way of example, can be a plano-convex lens. Curved layer 807A can, for example, be used to capture larger images and enhance signal strength. In another embodiment curved layer 807A is a separate optical element that is attached to skin contact layer 807 or is placed on top of skin contact layer 807 when the fingerprint is captured.

In another embodiment, skin contact layer 807 includes a compliant or pliable polymer coating (not shown). The pliable coating can, by way of example, be attached to skin contact layer 807, or it can be part of the cover plate, or it can be placed onto the cover plate before the fingerprint is captured. The pliable coating can be used to enhance image quality and reduce the dependence of SNR in the acquired fingerprint image on finger moisture or the wetting characteristic of the finger surface to skin contact layer 807 by improving the degree of optical contact between the surface topology of the skin of the finger and the skin contact layer.

In another embodiment skin contact layer 807 is formed from a material that has a refractive index that optimizes SNR of the captured image, such as fused silica, whereby the refractive index of the contact surface is similar to that of the surface of the finger or other skin surface.

Figure 8D:
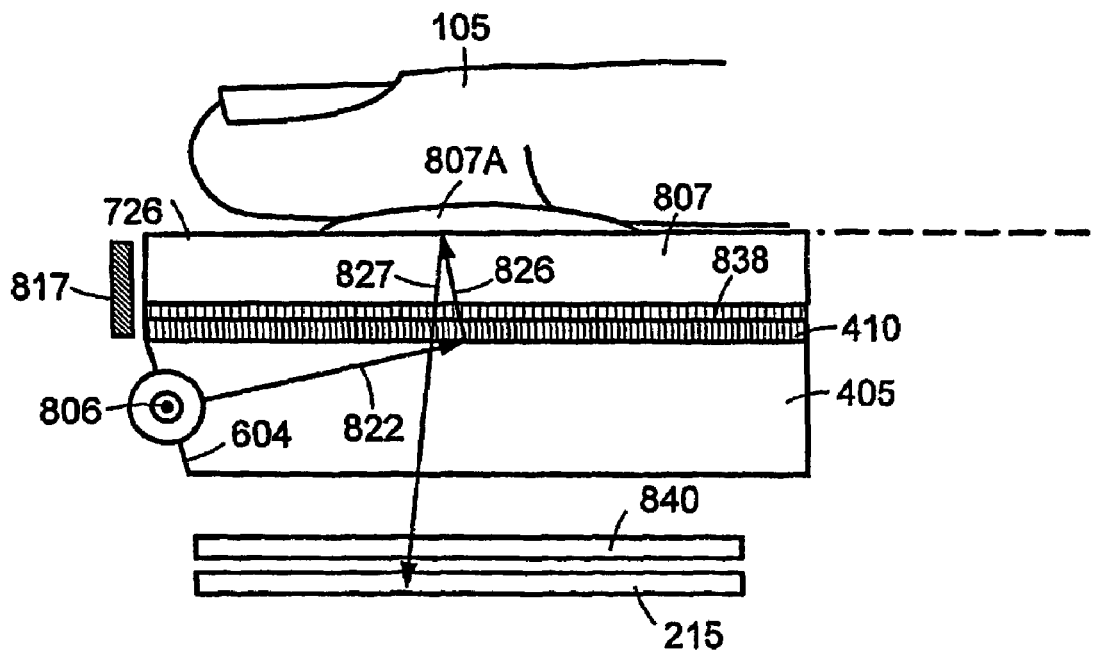

Referring to FIG. 8D, the devices of the present invention can also include additional optical components. In one embodiment, the present invention includes wave plate 838, preferably ¼ waveplate, in combination with linear polarizer 840 to reduce detection of noise that can arise undesirably from sources such as diffuse and specular reflection. In this manner the contrast of the fingerprint image can be improved. In one configuration, ¼ wave plate 838 can be sandwiched between HOE 410 and skin contact layer 807 or 807A (see FIG. 8C), and the linear polarizer 840 is located between waveguide 405 and above sensor array 215. When linearly polarized light is diffracted from HOE 410 in a direction of ¼ wave plate 838, the polarization is transformed upon propagating through ¼ wave plate 838 to circularly polarized light. Upon reflection from either the top surface 726 of skin contact layer 807 or 807A or from ridge structure of the finger, the circularly polarized light is transformed by ¼ wave plate 838 back into linearly polarized light that has an electric field direction that is orthogonal to the original direction of the light entering HOE 410. When light, diffracted by HOE 410, interacts with the ridge structure of the finger surface that is in contact with the top surface 726 of skin contact layer 807 or 807A, both diffuse and specular reflections occur, with the former being stronger in some embodiments. When the diffracted light interacts with the top surface 726 of skin contact layer 807 or 807A at locations that correspond to a portion of skin surface that does not touch top surface 726 at these locations, only specular reflected light occurs. Detection of the noise contributions from the reflected light can substantially increase the level of grey-scale detected for portions of the captured fingerprint that would otherwise most desirably be zero-grey scale level or black. High grey-scale levels for areas of the fingerprint image that otherwise should be black can substantially reduce contrast in the captured image and thus make image analysis more difficult. The diffuse reflected light can be partially to fully depolarized, and thus polarizer 620 can be oriented to at least partially block contributions of the diffuse reflected light from being captured by sensor array 215, thereby improving contrast. Linear polarizer 840, can be used to improve SNR by being positioned between skin contact layer 807 and sensor array 215.

It has been found that selecting a wavelength emitted by light source 205 that is in a range of wavelengths that are effectively absorbed by the finger (e.g., blue light with $\lambda \leq$ less than about 460 nm) reduces diffuse reflected light, thereby improving contrast.

It has been further found that additional improvements in SNR can be achieved by use of antireflection (AR) coatings on any of the surfaces that may reflect light other than skin contact layer 807. Those skilled in the art can select from a number of possible stacks of two-layer and multilayer films of different materials with different values of refractive index to provide for adequate antireflection performance. Typical AR coatings can achieve reduction in reflectivity to less than 0.1% at +/−10° from the normal to the surface of the coating. Similarly, use of transparent dielectric layers, that, by way of example, can be flexible polymeric film materials such as silicones or siloxanes characterized by having a low glass transition temperature, to eliminate air gaps between surfaces that reflect light at the interface with air, can improve SNR further by operating to substantially reduce the intensity of the light that originates from reflection(s) at interfaces between, for example, the waveguide substrate and air, or the linear polarizer and air, or the cover glass on the sensor and air or combinations thereof.

A preferred embodiment of the present invention will now be described with reference to FIG. 8A (side view) and FIG. 8B (top view).

The fingerprint device, depicted in FIG. 8A is composed of housing 818 that contains a light source 205. Light source 205 may contain one or more light sources that include a white light source such as a tungsten lamp, but preferentially light source 205 includes of one or more low-cost, high-efficiency sources such as light emitting diodes (LEDs) and/or semiconductor laser diodes. For reduced opto-mechanical alignment tolerances and simpler diffractive grating designs for HOE 410, it is desirable to collimate the radiation emitted from the light source. Lens element 602 is shown in FIG. 8A. Although a single transmissive lens is depicted, in general lens element 602 is composed of any combination of one or more transmissive and/or reflective optical elements such that the net optical effect is a substantial collimation of radiation emitted by light source 205. The collimated light emerging from lens element 602 is incident upon entrance edge 604 of waveguide 405. The angle $\phi_{SB}$ of the entrance edge 604 is specified so that optical axis 804 of the incident light beam propagating at an angle $\theta_1$ (relative to the z-axis) is refracted at entrance edge 604 so that beam 822 propagates at an angle $\theta_{SB}$ with respect to the normal to the interface between waveguide 405 and HOE 410. As a result, a sufficiently large footprint of light illuminates HOE 410 and therefore illuminates finger 105 or other topological surface of the skin.

Referring to FIG. 8A, thickness T is defined as the distance that separates the top 726 of skin contact layer 807 to surface 814 of sensor array 215. For compactness of the device and in order to reduce the thickness T, which plays a role in defining the spatial resolution of the fingerprint sensor, it is desirable that the angle $\theta_{SB}$ be large, for example greater than about 70° but it is preferable that $\theta_{SB}$ be less than about 80° for otherwise the device will exhibit large sensitivity to thermal changes. By way of example, for $\theta_{SB}=79°$ and a substrate block of thickness $T_{SB}=3.3$ mm approximately 17 mm [3.3·tan(79°)] length of the skin topology can be imaged in the z-direction. For the case of $\theta_{SB}=79°$, then with $\theta_1=17.5°$, and the substrate block composed of a material of index 1.53, $\phi_{SB}=90.9°$. Note that by having light source platform 662 tilted below the horizon, the opto-electro-mechanical components of the fingerprint sensor are allowed to lie below skin contact layer 807, thereby allowing for the housing 818 to be flush with said cover slide top.

Continuing to refer to FIG. 8A, the light, incident upon waveguide 405/HOE 410 interface, is refracted into HOE 410. In one embodiment, holographic grating of HOE 410 is a volume grating. One skilled in the art can design and engineer a surface-relief grating that would function similarly. Generally transmission volume holograms and surface relief gratings are polarization sensitive, and thus diffraction efficiency of the hologram can be significantly reduced when reconstructing a hologram with, for example, p-polarized light, if the grating is designed for s-polarized light. Polarization insensitive volume holograms, however, can also be recorded in materials that are sufficiently thick or exhibit large refractive index modulation or combinations thereof, and such holograms can also be used in the apparatus of the present invention. The diffracted beam 826 is propagating in a direction that is preferentially close to normal to surface 726 of skin contact layer 807, but at an angle different from the normal by at least the angular width of the Bragg selectivity of the volume grating in HOE 410. Diffracted beam 826 propagates through skin contact layer 807 and towards surface 726 and finger 105. The reflected beam 827 transmits back through skin contact layer 807 and HOE 410. Since reflected beam 827 is not Bragg-matched to the volume grating of HOE 410, minimal light loss occurs after transmission through HOE 410. Diffracted beam 826 is propagating in a direction substantially close to the y-axis such that the optical path length (OPL) of reflected beam 827 from surface 726 to detector surface 814 is minimized. The OPL of reflected beam 827 is critical in determining the resolution of the device since there are no optical elements providing for imaging of top of surface 726 onto detector surface 814. Therefore, the longer the OPL of reflected beam 827, the more blurred features of finger 105 (or other skin topology being examined) will become due to diffraction effects. Light from a collimated monochromatic light source will reflect and scatter from features of the surface topology of the skin surface, wherein said light will diverge with propagation distance from the feature after an OPL of one Fresnel length, $l_f$, expressed in terms of the area of the feature, $w^2$, and the wavelength, $\lambda$, as $$l_f = \frac{w^2}{5\lambda} \quad (2)$$

For pores in fingerprints, the Fresnel length is on the order of 1 mm for the smallest and about 14 mm for the largest Consequently shortest possible OPL is critical to resolving finer details of small topological features of the skin surface, such as pore or ridge contour information in fingerprints, palm prints, etc.

In one embodiment, there are several films, 810, 811 and 812, disposed between waveguide 405 and detector cover 813. These films may be arranged in many different manners, but their purpose serves to suppress reflections of light, in addition to filtering out unwanted noise. In one embodiment, film 810 is a linear polarizer film. Polarizer 810 preferentially has a polarization orientation substantially parallel to the polarization of the incident light ray 822. As such, polarizing film 810 suppresses portions of diffracted beam 826 that are scattered by finger 105 (and hence depolarized) from reaching sensor array 215. Film 811 is a wavelength filter. Wavelength filter 811 is preferentially tuned so that it substantially transmits wavelengths of light emitted by light source 205, and blocks all other wavelengths, and as such rejects ambient light originating outside of the housing 818 that would otherwise be incident upon sensor array 215. Film 811, by way of example, can be a dichroic film coating or a material that absorbs the desired spectral distribution of the ambient light, such as can be the case for a dyed plastic. Note that the wavelength filtering properties of film 811 can be incorporated into the bulk material or as a coating on either waveguide 405, skin contact layer 807, and/or detector cover 813, thereby eliminating the need for wavelength filter 811. Film 812 is an index-matching material where the index of refraction of said material preferentially matches within about 0.15 to the index of refraction of film 811 and detector cover 813. As a result, the intensity of reflected light at the interfaces of film 812 is not greater than about 0.25% of the intensity of the incident light at the boundaries of film 812. Alternatively, if index-matching material is not desired, it is preferred that the space shown occupied by film 812 be replaced by a small air gap (for example, approximately 0.1 to 0.2 mm) and that the film 811 and detector cover 813 each have an anti-reflection (AR) coating on their two opposing surfaces.

The light transmitted by detector cover 813 is incident upon sensor array 215. In one embodiment, sensor array 215 comprises a plurality of detector elements that enable a 2-D image of the fingerprint to be captured. Sensor array 215 can be a 2-D or 1-D charge coupled device (CCD), but is preferentially a detector requiring lower electrical power such as a 2-D or 1-D CMOS device. For the reduction of stray light, which for a coherent light source can lead to the creation of interference fringes that may be mistakenly construed for features on the skin being examined, one preferentially has an AR coating at the detector cover 813 surface that faces the sensor array 215. Sensor array 215 is mounted to a circuit board 805 that may can contain other electronic circuitry designed for the analysis of the acquired images, such as the circuitry that includes the camera electronics 220, the controller circuits 225 or any combination thereof. The processed data is sent via cable 820 to bulk-head connector 821 that allows the fingerprint sensor to transmit data 125 and control functions 165 to a host computer 130. Bulk-head connector 821 and cable 820 are preferentially used to transmit the power to the power-consuming elements of the device of the present invention. In one embodiment, a wireless transceiver/transmitter pair can be integrated into the device of the present invention for transmission of data a remote host.

In one embodiment, skin contact layer 807 preferentially maximizes the contrast ratio between the ridges and valleys of the skin being scanned. The valleys of the skin in contact with skin contact layer 807 do not touch top surface 726, resulting in diffracted beam 826 reflecting at the resulting interface between top surface 726 with air. To maximize contrast between the ridges and the valleys, in one embodiment, top surface 726 of skin contact layer 807 is made of a material that has a low index of refraction that preferentially matches the index of refraction of the skin surface at the wavelengths emitted by light source 205. Although polymer materials such as silicone can be used to match the index of refraction of the skin (n~1.36) well, these materials are not durable and will wear easily in use. Materials with low indices of refraction such as fused silica ($n_D$=1.458), Corning Pyrex™ (1.474) or Schott BoroFloat™ 33 (1.471) are preferred as they are harder and can withstand more use without, for example, being scratched or marred. In another embodiment, skin contact layer 807 is coated with an optical thin-film stack. This thin-film stack can be designed by one skilled in the art such that the reflectivity at the wavelengths emitted by light source 205 are minimized for the interface between skin contact layer 807 and the skin, but is maximized for the interface between skin contact layer 807 and air. In another embodiment this thin-film stack is designed by one skilled in the art such that the reflectivity at the wavelengths emitted by light source 205 are maximized for the interface between skin contact layer 807 and the skin, but is minimized for the interface between skin contact layer 807 and air.

FIG. 8B depicts a top-down view of the embodiment of the device shown in FIG. 8A. In one embodiment, the width of the beam in the x-direction illuminating waveguide 405 and hence the illuminated width of finger 105 is dictated by the width of the beam that enters lens element 602. For the embodiment of light source 205 containing at least one semiconductor laser, the divergence of a semiconductor laser diode is anamorphic. With such an anamorphic beam, the angle of rays 823 (see FIG. 8A) and 824, emerging from light source 205 and representing the 50% drop in intensity level of the beam, will make angles of $\theta_s$ and $\theta_f$, respectively, with respect to optical axis 804. For typical laser diodes, the ratio of these two angles is approximately 3:1, which means the beam is substantially elliptical in a cross section perpendicular to optical axis 804.

By way of example, consider the specification that the fingerprint device must be capable of examining a 17×17 mm area of skin. As illustrated earlier, a thickness $T_{SB}$ of 3.3 mm can accommodate the 17 mm skin size in the z-direction. To accommodate the 17 mm in the x-direction, the waveguide must be at least 17 mm wide in this direction (as does the beam width of light in the x-direction from light source 205 that illuminates entrance edge 604). Therefore entrance edge 604 is substantially rectangular having dimensions in x and y of 17 mm and 3.3 mm, respectively. For maximum light efficiency, it is preferable that the fast axis of the laser (e.g., the axis of the laser that diverges the fastest), with full width at half maximum (FWHM) of $2\theta_f$, be in the direction of the 17 mm width of waveguide 405 (corresponding to the x-axis). Likewise, the slow-axis (axis of the laser that diverges the slowest) having FWHM of $2\theta_s$, will correspond to the direction of the 3 mm thickness of waveguide 405.

In addition to the mechanical matching of beam widths and footprints for the area to be imaged of the topological surface of the skin, use of a diffraction optical element 410, that operates to diffract light so as to illuminate said surface of the skin, is generally polarization dependent. Consequently, use of correct polarization is preferred to achieve good SNR of the system. For a single transverse mode laser diode, the polarization of the laser diode will be perpendicular to the fast axis. For a laser diode oriented for optimized light transmission through entrance edge 604 (see FIG. 8A), the polarization of the collimated laser light will be TM-polarized (magnetic field polarized perpendicular to the plane of incidence) relative to the boundary between waveguide 405 and HOE 410. Therefore, in one embodiment, HOE 410 is designed for TM-polarized light. If the diffraction grating of HOE 410 has peak diffraction efficiency for TE-polarized light (electric field polarized perpendicular to the plane of incidence), then some means of rotating the polarization of the electric field that is incident upon entrance edge 604 is required. Though one skilled in the art can use any of the numerous ways of rotating the polarization that include the use of birefringent prisms, cascaded linear polarizers, or cascaded mirrors, the preferred method uses a wave plate 819, preferably a half-wave plate, to rotate the TM-polarized light of diode to TE-polarized.

It is known in the art that a volume grating can be theoretically designed for high diffraction efficiency for TE polarization, TM polarization, or for random polarization. The condition for peak diffraction efficiency ($\eta \sim 100\%$) in a lossless dielectric thick volume grating can be derived using two-wave coupled-wave diffraction theory. See H. Kogelnik, "Coupled Wave Theory for Thick Hologram Gratings," *Bell Syst. Tech. J.* 48 (1969), pp. 2909-2947, the entire teachings of which is herein incorporated by reference. For TE-polarized light the condition on the index of refraction modulation $n_1$ and the thickness of the grating d is given by $$n_1 d|_{TE\ optimized} = \left(m + \frac{1}{2}\right)\lambda \sqrt{\cos\theta\left(\cos\theta - \frac{\lambda}{\Lambda}\cos\phi\right)}, \quad (3)$$

where $\lambda$ is the free-space wavelength, $\theta$ is the angle of incidence in the volume medium, and $\phi$ is the slant angle of the grating vector K of the grating with respect to the surface normal of the volume layer, and m is a non-negative integer. For TM-polarized light, the condition on $n_1$ and d is given by $$n_1 d|_{TM\ optimized} = \left(m + \frac{1}{2}\right)\lambda \sqrt{\frac{\cos\theta\left(\cos\theta - \frac{\lambda}{\Lambda}\cos\phi\right)}{\cos[2(\theta - \phi)]}}. \quad (4)$$

It is also possible to record a hologram that is polarization independent. One example of a method for recording such a hologram is disclosed in a Published U.S. Patent Application US 2003/0007201, the teachings of which are herein incorporated by reference in their entirety. Briefly, the diffraction efficiency of a hologram is a periodic function of the value of the grating strength of the hologram, which is dependent upon a material property, namely the value of its refractive index modulation. For photopolymer recording materials, the refractive index modulation, in turn, depends primarily on the degree of chemical segregation achieved in the recording material of the polymerizable component and the binder and the relative refractive index difference between the polymerizable component and the binder in the recording material, but it also may depend on thickness of the recording material, angles of incidence of the beams used to record the hologram and thereby the grating period, as well as the wavelength of the light used to record the hologram. For a given refractive index modulation achieved by the recording material, the grating strength is dependent upon similar parameters such as grating period, thickness, and wavelength. A hologram is optimized for a particular polarization when it is recorded using such combination of the above parameters that the resulting value of refractive index modulation corresponds to a peak of the diffraction efficiency. Ordinarily, the peaks of diffraction efficiencies of the holograms optimized for s- and p-polarized light do not occur at the same values of the refraction index modulation or grating strength (i.e. same values of the above-mentioned parameters). However, using the periodicity of the diffraction efficiency as a function of the value of the refractive index modulation or grating strength, it is possible to record a hologram that is optimized for both s- and p-polarized light. Since any light wave can be described as superposition of s- and p-polarized waves, a hologram that is simultaneously optimized for s- and p-polarized light is said to be polarization independent.

In the preferred embodiment of the device of the present invention, beam blocks 816 and 817 are integrated into the design. Beam block 816 is designed such that light from light source 205 does not enter sensor array 215 or any of the film layers, 810 through 812. Beam block 817 is designed so that light from light source 205 does not impinge onto finger 105, HOE 410, or skin contact layer 807. Both beam blocks 816 and 817 are positioned as close to entrance edge 604 as possible in order to minimize adverse diffraction effects due to the clipping of the light beam, collimated by lens element 602, by edges before the light beam reaches entrance edge 604. By incorporating beam blocks 816 and 817 into the device, the amount of stray light reaching sensor array 215 is reduced.

For a volume grating, the angle of incidence of light on the grating is critical since, due to Bragg selectivity, light incident at incorrect angles will not be diffracted or will be diffracted less efficiently. The embodiment shown in FIG. 8A and FIG. 8B allows for adjustment, manual or otherwise, such as by use of control circuits with controllers and actuators, of the angle of incidence of beam 822 onto HOE 410.

In this embodiment, there is provided laser platform 803 that is mechanically constructed such that it pivots about the center line 806 of entrance edge 604. The pins 839 are aligned with the centerline 806 and over said pins are place sleeves 840 that are coupled to the laser platform 803. Though not drawn, springs and adjustment screws are preferentially attached to laser platform 203 so that the orientation of laser platform 203 can be set. In this manner, $\theta_1$ can be tuned, such as manually with use of feedback from sensor 215 or other sensors or detector, or by use of actuators with controls circuits and actuators, while maintaining the alignment of optical axis 804 relative to the center of entrance edge 604. By tuning $\theta_1$, one tunes $\theta_{SB}$ and therefore the angle of the light incident upon HOE 410, thereby allowing for the tuning of maximum diffraction efficiency by the volume grating.

Figure 9:
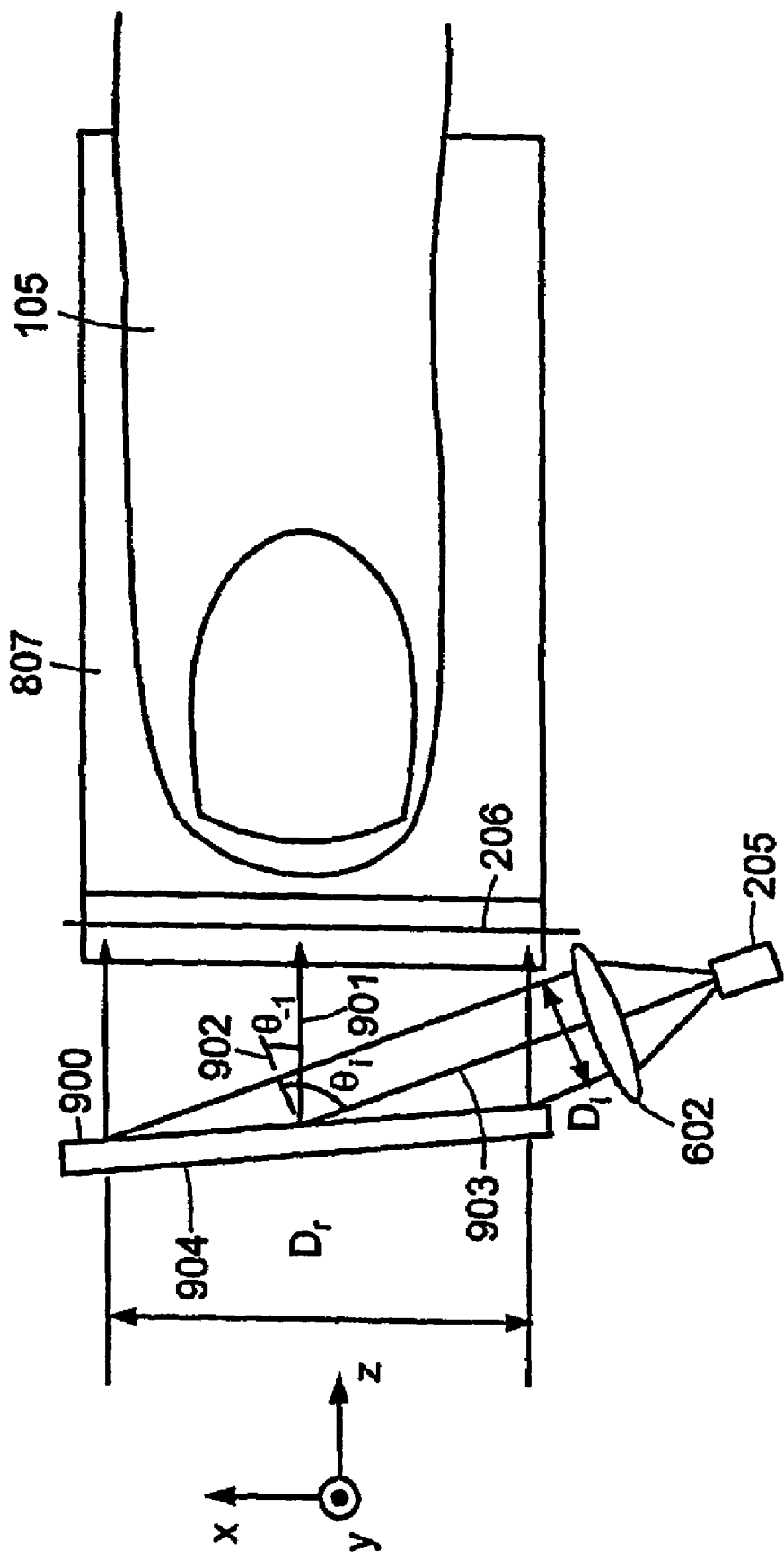
FIG. 9 is a schematic diagram of another embodiment of the imager in the fingerprint sensor of FIG. 1 illustrating a use of a grazing incidence reflection grating.

During the operation of the device of FIGS. 8A and 8B, light beam from source 205 is anamorphically expanded, i.e. only one axis of the crossection of the beam emerging from lens element 602 is expanded by propagating through waveguide 405 and diffracting on HOE 410 Referring to FIG. 9, the use of a grazing incidence reflection grating 904 allows anamorphic expansion of a beam of diameter $D_i$ to a beam of diameter $D_r$ along the x direction. As depicted, reflection grating 904 has a reflective grating surface 900 whose features are designed such that the first-order diffracted beam 901 enters entrance edge 604 (not shown) parallel to the z-direction.

The grating geometry of FIG. 9 has the advantage that beam expansion in the xz plane is accomplished. The achieved beam expansion of the incident beam of diameter $D_i$ is given by $$\frac{D_r}{D_i} = \frac{\cos\theta_{-1}}{\cos\theta_i}, \quad (5)$$

where $\theta_{-1}$ is the angle of the diffracted $-1^{st}$ order reflected beam 901 measured relative to the grating surface normal 902 and $\theta_i$ is the angle of incidence of the incident beam 903 relative to grating surface normal 902.

As an example of such a reflective anamorphic beam expanding grating, consider a 1600 lp/mm reflection grating. Consider further that light source 205 is a semiconductor diode laser of 655 nm wavelength radiation and that beam 903 is incident upon said 1600 lp/mm reflection grating at $\theta_i=85°$. The resultant diffracted negative first order propagates at $\theta_{-1}=2.97$ and the expansion ratio $D_r/D_i$ achieved is 11.5. Note that one skilled in the art can design and engineer other gratings (for example, surface-relief or volume), including gratings wherein the incident beam 903 transmits through a substrate such that it illuminates the grating from inside of the substrate material (for example a glass) which then transmits the required diffraction order for achieving the level of anamorphic beam expansion required. Whether a transmission or a reflection grating is designed to perform the required anamorphic beam expansion in the xz plane, it is preferable that the grating have a sufficiently high frequency such that a minimum number of diffraction orders propagate other than the order of interest. In this manner, one can make the distance between the grating 904 and the waveguide 405 as short as possible such that only a single diffraction order enters into the substrate block.

In the embodiment shown in FIG. 9, the diffracted beam 901 travels substantially parallel to the z-axis. The geometry of the fingerprint sensor illustrated in FIGS. 8A and 8B indicates the preference for a HOE 410 that has grating fringes that are primarily tilted in the y-z plane, but are approximately uniform along the x-direction. As such, HOE 410 has Bragg-matching conditions that require fractions of a degree of control of the light propagation angle in the y-z plane, but less stringent (>5 degrees) requirements for the angle of light propagation in the x-z plane. Consequently, mechanical alignment of the beam emerging from lens element 602 has larger tolerances in the x-y plane than in the y-z plane.

For optimal performance of the device of the present invention, it is preferred that the device be athermalized, i.e. capable of temperature compensating, as described above. One skilled in the art can model the effect of temperature changes on the ray paths of light entering the waveguide and the HOE, respectively, and derive relationships between the material properties of the HOE and the waveguide in order to achieve athermalization. From this analysis, one skilled in the art will conclude that HOE 410 and waveguide 405 and/or skin contact layer 807, should preferably be constructed from material that has substantially similar coefficients of thermal expansion or thermo-optic coefficients or both. As used herein, the term "thermo-optic coefficient" refers to the value of the derivative of the refractive index n=n(T) with respect to temperature T, i.e. dn/dT. By way of example, for an HOE constructed from a photopolymer having a dn/dT of $-2.0 \times 10^{-4}$, one would preferentially choose the moldable plastics Zeonex E48R (dn/dT=$-1.0 \times 10^{-4}$) or Zeonex 330R (dn/dT=$-1.2 \times 10^{-4}$) over glass such as BK7 (dn/dT=$3.0 \times 10^{-6}$). Alternatively, the device can be athermalized by use of a heater that maintains the HOE at constant temperature. In still another embodiment the device may comprise a second light source emitting at a different wavelength from light source 205, whereby said second light source operates so as to be adsorbed by a material in HOE 410 and thereby maintain the temperature of HOE 410 at a suitably constant temperature.

EXEMPLIFICATION

A fingerprint of the forefinger of the right hand of one our staff was recorded in 1996 using the optical design shown in FIG. 4. Total image area captured of said fingerprint was approximately 0.15×0.15 inches. The fingerprint as captured was displayed on an analog video monitor and a black and white photograph of the image was obtained using a Polaroid instant camera with high contrast black and white film. Subsequently, said photograph of said fingerprint was stored under ambient conditions.

In 2003, 6.5 years later, said Polaroid photographic image was digitized by scanning at 600 dpi, and used as a training template for an example of the fingerprint correlation software of this invention. A new image of the same finger was acquired in 2003 using a fingerprint imager of this invention comprising the optical design of FIG. 4. The captured fingerprint was compared to the scanned image of the 6.5-year-old photograph of the original fingerprint. A positive identification, using locations of pores, the fine detail of the ridge contour at the boundaries of ridges and valleys, and minutiae was readily achieved, even though the said original and new images represent a finger area only ⅛" by ⅛", scale and rotation were different, the photograph had distortions due to being obtained from an image of the original fingerprint as displayed on a curved surface of a video monitor, and contrast and exposure were not matched nor calibrated in any way. At least 50 features, including 45 pores and 5 minutia points were captured from the original scan of the 1996 image, of which 22 pores and 5 minutia were present, detected and matched in the captured fingerprint imaged in 2003. The successful correlation results show that including pores in the fingerprint as well as the fine details of the ridge contour, by use of an apparatus that is capable of acquiring fingerprint images at high resolution, greatly increases the number of features that can be used for image correlation and significantly enhances the reliability of fingerprint comparison. Beneficial effects of the enhancements provided by the apparatus and method of this invention provide for reducing the occurrence of false acceptance, improving (through use of multiple templates) false reject rates, and significantly reducing the fingerprint sample area required for positive unique and deterministic authentication and identification.

Figure 10:
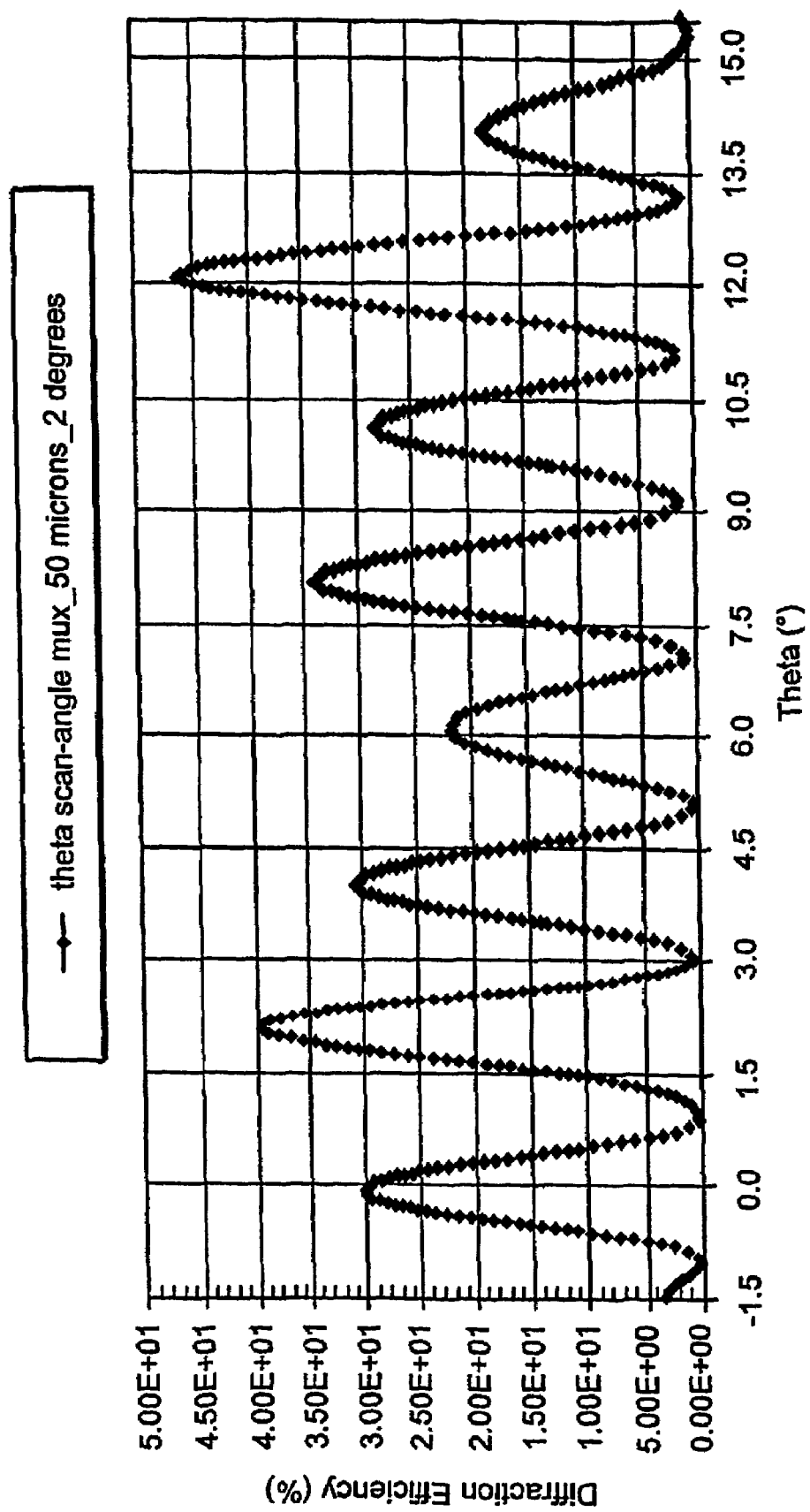
FIG. 10 is a waveform plot illustrating Bragg detuning characteristics for an embodiment of the fingerprint sensor of FIG. 1.

FIG. 10 shows the Bragg detuning characteristics for 8 co-locationally multiplexed slant fringe plane-wave holograms recorded in 50 micron thick USLH-500-7A Aprilis holographic recording medium. Recording was carried out in the conventional manner using angle multiplexing where the increment of the recording angles for each of the co-locationally multiplexed holograms corresponds to twice the value for the full angle width at half height of the respective Bragg detuning curves. Each hologram was recorded with equal beam intensities of 4 mW in the Reference and Signal beam paths using spatially filtered and collimated light with a fixed value for the interbeam angle of 48.6°, and the sample was rotated about the vertical axis by increments of 2° for each subsequent recording. Recording times used for the sequential recording of the co-locationally multiplexed hologram were varied in order to achieve similar diffraction efficiency for each of the holograms, as the recording sensitivity of the multiplexed holograms were about 27, 30, 24, 16.75, 15.65, 7.9, 4.2 and 1.2 cm/mJ, respectively, for holograms #1-#8. The cumulative grating strength for the 8 multiplexed holograms corresponds to the case where $v/\pi \geqq 1$, and thus a substantially overmodulated hologram could have been recorded as a single plane-wave hologram.

Figure 11:
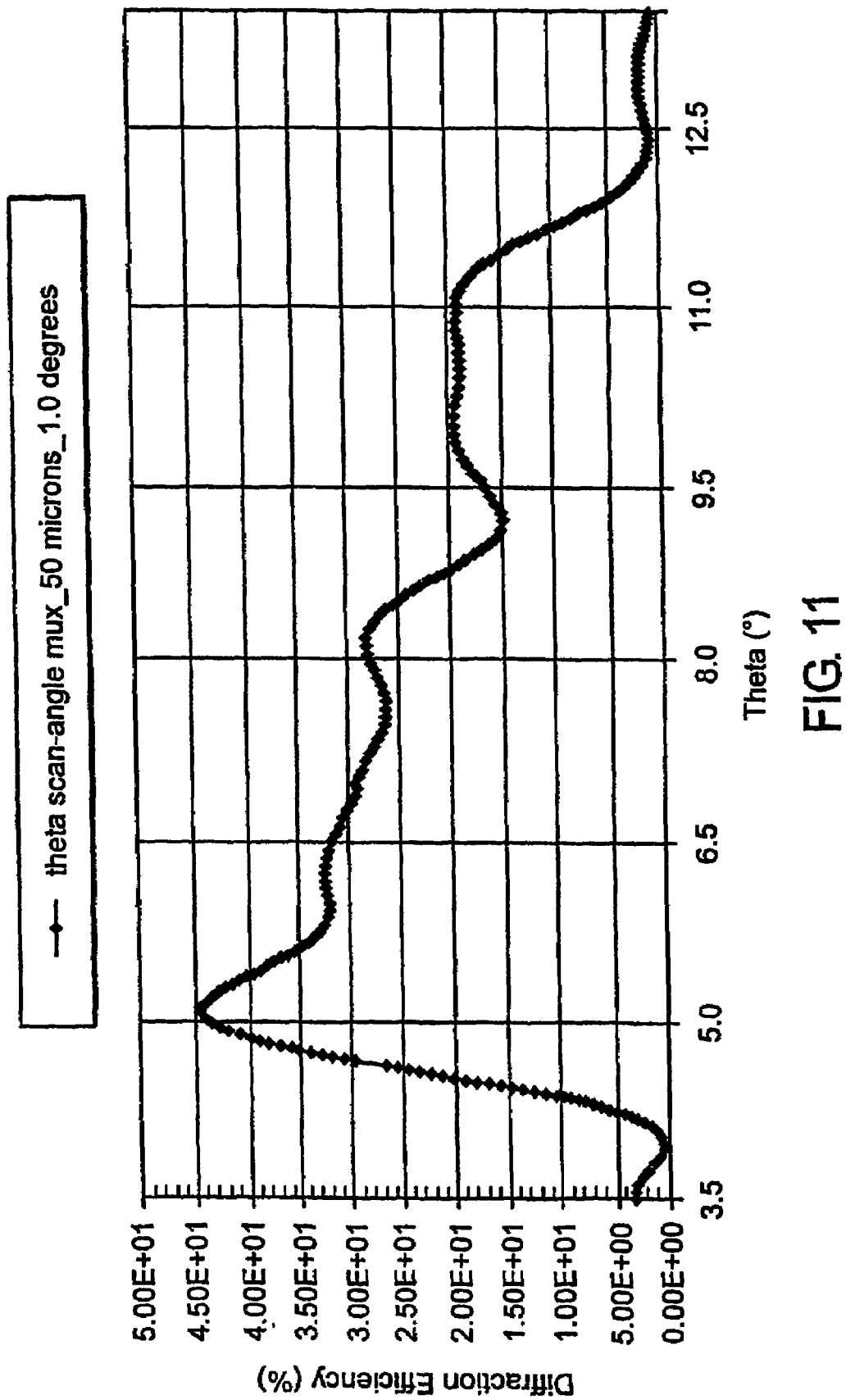
FIG. 11 is a plot of a range of diffraction efficiency as a function of the value of the Bragg detuning angle of FIG. 10.

When the separation angle between the multiplexed holograms is reduced to an increment equal to the full width at half height of the Bragg detuning curve, then the resultant Bragg selectivity curves of the holograms are convoluted as shown in FIG. 11. The range of diffraction efficiency shown in FIG. 11 as a function of the value of Bragg detuning angle was not optimized for achieving a more desirable top hat type manifold. Nevertheless, the results in FIG. 10 and FIG. 11 are illustrative of the use of multiplexed holograms to provide for a means of compensating for temperature variations of the fingerprint device.

While this invention has been particularly shown and described with references to preferred embodiments thereof, it will be understood by those skilled in the art that various changes in form and details may be made therein without departing from the scope of the invention encompassed by the appended claims.

The invention claimed is:

1. An apparatus for fingerprint image acquisition comprising:
    a waveguide, having an entrance edge and top and bottom surfaces;
    a light source, configured to direct a light beam toward the entrance edge of the waveguide;
    a skin contact layer, disposed at or near the top surface of the waveguide or bottom surface of the waveguide;
    a holographic optical element (HOE), disposed at the top or at the bottom surface of the waveguide, configured to diffract the light beam incident from the light source to the skin contact layer;
    a sensor array, configured to detect light reflected from the interface between skin and the skin contact layer,
    wherein the HOE includes
    a layer comprising a grating; and
    at least one supporting layer in contact with the said grating layer, wherein
    the grating layer and the at least one supporting layer have substantially similar coefficients of thermal expansion or thermo-optic coefficients or both.

2. An apparatus for image acquisition of topological features of the surface of skin comprising:
    a waveguide, having an entrance edge and top and bottom surfaces;
    a light source, configured to direct a light beam at the entrance edge of the waveguide;
    a skin contact layer, disposed at or near the top surface or the bottom surface of the waveguide;
    a holographic optical element (HOE), disposed at the top or at the bottom surface of the waveguide, configured to diffract the light beam incident from the light source to the skin contact layer;
    a sensor array, configured to detect light reflected from the interface between skin and the skin contact layer; and
    means for compensating for changes in the Bragg matching condition of the HOE due to changes in temperature.

3. The apparatus of claim 2 wherein the means for compensating for temperature-induced changes in the Bragg matching condition of the HOE includes controlling the temperatures of the HOE.

4. The apparatus of claim 2 wherein the means for compensating includes one or more means for adjusting the angle of incidence of the light beam from the light source at the waveguide or adjusting the angle between the entrance edge and the top or bottom surface of the waveguide with respect to the angle of incidence of the beam directed from the light source at the waveguide, to compensate for change in the intensity of diffraction of light by the HOE due to temperature-induced change in the Bragg matching condition for the HOE.

5. The apparatus of claim 2 wherein the HOE is configured to diffract the light beam in a direction that differs from the perpendicular to the skin contact layer by an angle that exceeds the angular width of the Bragg matching condition of the HOE.

6. The apparatus of claim 2 wherein the HOE is optimized for an s-polarized incident beam.

7. The apparatus of claim 2 wherein the HOE is optimized for a p-polarized incident beam.

8. The apparatus of claim 2 wherein the HOE is polarization independent.

9. The apparatus of claim 2 further comprising a lens element configured to collimate and direct the light beam from the light source at the entrance edge of the waveguide,
    wherein the means for compensating includes means for mounting one or more of the light source, the lens element or the waveguide, and wherein the means for mounting is thermally expandable and is configured to adjust the angle of incidence of the light beam onto the waveguide or the HOE.

10. The apparatus of claim 9 wherein the means for mounting one or more of the light source, the lens element or the waveguide comprises a rod or bar.

11. The apparatus of claim 2 wherein the means for compensating includes one or more actuators, configured to adjust the angle of incidence of the light beam onto the waveguide or the HOE.

12. The apparatus of claim 11 wherein further including an optional lens element.

13. The apparatus of claim 12 wherein the actuator adjusts the position of one or more of the light source, the lens element or the waveguide.

14. The apparatus of claim 13 wherein the actuator is electronically controlled.

15. The apparatus of claim 14 wherein intensity of the light reaching one or more of a plurality of pixels of the sensor array is measured to provide a signal that is used to control the actuator.

16. The apparatus of claim 15 wherein intensity of the light diffracted by the HOE and detected by the sensor array is measured to provide the signal that controls the actuator.

17. The apparatus of claim 15 further including at least one second sensor and wherein the intensity of the light reaching the second sensor is measured to provide the signal that controls the actuator.

18. The apparatus of claim 17 wherein the difference in intensities of the light diffracted by the HOE and the undiffracted light is measured to provide the signal that controls the actuator.

19. The apparatus of claim 17 further including at least one additional hologram, spaced apart and disposed next to the HOE, said additional hologram configured to diffract a portion of the light incident on the HOE to the second sensor, wherein measuring the intensity of the light diffracted from the additional hologram provides the signal to control the actuator.

20. The apparatus of claim 12 wherein the position of one or more of the light source, the lens element or the waveguide is manually controlled by measuring intensity of the light diffracted by the HOE and detected by one or more of a plurality of pixels of the sensor array.

21. An apparatus for image acquisition of topological features of the surface of skin comprising:
   a waveguide, having an entrance edge and top and bottom surfaces;
   a light source, configured to direct a light beam at the entrance edge of the waveguide;
   a skin contact layer, disposed at the top or bottom surface of the waveguide;
   a holographic optical element (HOE), disposed at the top or at the bottom surface of the waveguide, configured to diffract the light beam incident from the light source at the skin contact layer;
   a sensor array, configured to detect light reflected from the interface between skin and the skin contact layer,
   wherein the HOE includes at least two co-locationally multiplexed holograms.

22. The apparatus of claim 21 wherein the multiplexed holograms are configured so that the Bragg matching condition of the multiplexed holograms is substantially overlapping.

23. The apparatus of claim 21 wherein the multiplexed holograms are planar-angle multiplexed and wherein the increment of the recording angle for multiplexing is less than the width of the angle Bragg matching condition of each earlier-recorded multiplexed hologram.

24. The apparatus of claim 21 wherein the grating periods of the multiplexed hologram are not equal.

25. An apparatus for image acquisition of topological features of the surface of skin comprising:
   a waveguide, having an entrance edge and top and bottom surfaces;
   a light source, configured to direct a light beam at the entrance edge of the waveguide;
   a skin contact layer, disposed at the top or bottom surface of the waveguide;
   a holographic optical element (HOE), disposed at the top or at the bottom surface of the waveguide, configured to diffract the light beam incident from the light source at the skin contact layer;
   a sensor array, configured to detect light reflected from the interface between skin and the skin contact layer; and
   a laser diode configured to change the operating wavelength of the light source in response to temperature-induced changes in the Bragg matching condition of the HOE.

26. The apparatus of claim 25 wherein the HOE is configured to diffract the light beam in a direction that differs from the perpendicular to the skin contact layer by an angle that exceeds the angular width of the Bragg matching condition of the HOE.

27. The apparatus of claim 25 wherein the HOE is optimized for an s-polarized incident beam.

28. The apparatus of claim 25 wherein the HOE is optimized for a polarized incident beam.

29. The apparatus of claim 25 wherein the HOE is polarization independent.

30. The apparatus of claim 25 wherein the light source is a multi-wavelength light source.

31. An apparatus for image acquisition of topological features of skin surface,
comprising:
   a waveguide, having an entrance edge and top and bottom surfaces;
   a light source, configured to direct a light beam at the entrance edge of the waveguide;
   a skin contact layer, disposed at the top surface of the waveguide;
   a holographic optical element (HOE), disposed at the top or at the bottom surface of the waveguide, configured to diffract the light beam at the skin contact layer and having a Bragg matching condition;
   a sensor array, configured to detect light reflected from the interface between skin and the skin contact layer, and
   means for compensating for changes in the Bragg matching condition of the HOE due to changes in temperature,
   wherein the light source is a broad wavelength spectrum light source, the wavelengths of which can reconstruct the HOE.

32. The apparatus of claim 31 further including a lens element, configured to direct the light beam from the light source at the entrance edge of the waveguide.

33. The apparatus of claim 31 wherein the HOE is configured to diffract the light beam in a direction that differs from the perpendicular to the skin contact layer by an angle.

34. The apparatus of claim 33 wherein the HOE has a diffraction efficiency of at least about 50%.

35. The apparatus of claim 33 wherein the HOE has a diffraction efficiency of at least about 75%.

36. The apparatus of claim 33 wherein the HOE has a diffraction efficiency of at least about 90%.

37. The apparatus of claim 33 wherein the light from the light source is directed at the entrance edge so that said light directly refracts to the HOE.

38. The apparatus of claim 31 wherein the HOE includes at least two multiplexed holograms.

39. The apparatus of claim 31 wherein the HOE is optimized for an s-polarized incident beam.

40. The apparatus of claim 31 wherein the HOE is optimized for a polarized incident beam.

41. The apparatus of claim 31 wherein the HOE is polarization independent.

42. The apparatus of claim 31 wherein the entrance edge of the waveguide forms an oblique angle with the top and bottom surfaces.

43. The apparatus of claim 31 wherein the entrance edge has optical power and is configured to direct the light beam from the light source at the HOE.

44. The apparatus of claim 31 wherein the waveguide includes light traps at the surface opposite to the entrance edge.

45. The apparatus of claim 31 wherein the waveguide includes a reflective metal coating along its bottom surface at or near the entrance edge of the waveguide.

46. The apparatus of claim 31 further including a wave plate configured to produce a direction of polarization that is optimal for diffraction by the HOE.

47. The apparatus of claim 46 wherein the wave plate is a half-wave plate.

48. The apparatus of claim 47 wherein the half-wave plate is disposed between the light source and the entrance edge of the waveguide and configured to rotate the plane of polarization of the light beam so that it is optimal for diffraction by the HOE.

49. The apparatus of claim 31 further including a linear polarizer disposed between the skin contact layer and the sensor array.

50. The apparatus of claim 49 wherein at least one surface of the polarizer includes an antireflection coating.

51. The apparatus of claim 49 wherein at least one surface of the polarizer includes a dielectric layer.

52. The apparatus of claim 51 wherein the dielectric layer includes derivatives of silicone or siloxane.

53. The apparatus of claim 31 wherein the skin contact layer has a refractive index higher than about 1.3.

54. The apparatus of claim 31 wherein the skin contact layer has a refractive index that is between about 1.30 and about 1.50.

55. The apparatus of claim 31 wherein the skin contact layer comprises a portion having optical power configured to direct the light reflected from the interface between skin and the skin contact layer to the sensor array.

56. The apparatus of claim 31 wherein the portion having optical power is curved.

57. The apparatus of claim 55 wherein the portion having optical power is a plano-convex lens.

58. The apparatus of claim 31 further including a lens element attached to the skin contact layer configured to direct the light reflected from the interface between skin and the skin contact layer to the sensor array.

59. The apparatus of claim 31 wherein the skin contact layer comprises a layer of a polymer having a glass transition temperature less than ambient use temperature of the device.

60. The apparatus of claim 31 wherein the skin contact layer is coated with a layer of polymer having a glass transition temperature less than ambient use temperature of the device.

61. The apparatus of claim 31 wherein the skin contact layer comprises a glass material having a refractive index between about 1.45 and 1.50.

62. The apparatus of claim 31 wherein the skin contact layer comprises a top surface having surface energy of less than about 30 mJ/m$^2$.

63. The apparatus of claim 31 further including at least one of a ¼ wave plate and a linear polarizer disposed between the skin contact layer and the sensor array.

64. The apparatus of claim 63 wherein the ¼ wave plate is disposed between the HOE and the skin contact layer and the linear polarizer is disposed between the waveguide and the sensor array.

65. The apparatus of claim 31 wherein the light source wavelength is in a range from about 400 nm to about 1000 nm.

66. The apparatus of claim 65 wherein the light source wavelength is in a range from about 400 nm to about 535 nm.

67. The apparatus of claim 31 wherein at least one of the surfaces of the waveguide or the sensor array include an antireflection coating.

68. The apparatus of claim 31 wherein at least one of the surfaces of the waveguide, or the holographic optical element, or the sensor array, or the skin contact layer include a dielectric layer.

69. The apparatus of claim 68 wherein the dielectric layer includes a polymeric film having a glass transition temperature less than ambient use temperature of the device.

70. The apparatus of claim 31 wherein the sensor array has a resolution of at least 1100 pixels per inch in the acquired image.

71. The apparatus of claim 31 wherein the sensor array is a CCD or CMOS imager.

72. The apparatus of claim 31 wherein the light source is a light emitting diode (LED).

73. A method of acquiring an image of the topology of the surface of skin, comprising:
   receiving a surface of skin by a device for image acquisition of the topological features of the surface of skin wherein said device includes a waveguide having an entrance edge and top and bottom surfaces, and a holographic optical element (HOE) having a Bragg matching condition;
   directing a light beam at the HOE, thereby diffracting the light beam;
   directing the diffracted light beam at the interface between skin and the skin contact layer, thereby reflecting the light beam;
   compensating for temperature-induced changes in the Bragg matching condition of the HOE; and
   detecting the reflected light, thereby acquiring the image of the topological features of the surface of skin by said device.

74. The method of claim 73 wherein compensating for temperature-induced changes in the Bragg matching condition of the HOE includes controlling the temperature of the HOE.

75. The method of claim 73 wherein the HOE includes a diffraction grating having at least one dimension that is greater than the cross-section of the light beam, and
   wherein the light beam is directed at the HOE at an angle that is less than about 90° with respect to the plane of the HOE, said HOE diffracting light at an angle that is less than the incident angle of the light directed at the HOE, thereby anamorphically expanding the light beam.

76. The method of claim 73 wherein the image acquisition device further includes
   a skin contact layer disposed at the top surface of the waveguide;
   a light source, configured to direct a light beam at the entrance edge of the waveguide; and
   a sensor array, configured to detect light reflected from the interface between skin and the skin contact layer.

77. The method of claim 76 wherein compensating for temperature-induced changes in the Bragg matching condition of the HOE includes adjusting an angle of incidence of the light beam onto the HOE or the wavelength of the light beam.

78. The method of claim 77 wherein the image acquisition device further includes a lens element, configured to direct the light beam from the light source to the entrance edge of the waveguide and means for mounting one or more of the light source, the lens element or the waveguide, and wherein compensating for temperature-induced changes in the Bragg matching condition of the HOE includes selecting at least one of the mounting means to be thermally expandable and configuring the selected means to adjust the angle of incidence of the light beam onto the HOE.

79. The method of claim 78 wherein the means for mounting the light source is a thermally expandable rod or bar.

80. The method of claim 78 wherein the image acquisition device further includes a controllable actuator, configured to adjust an angle of incidence of the light beam onto the HOE.

81. The method of claim 80 wherein compensating for the temperature-induced changes in the Bragg matching condition of the HOE includes controlling the actuator by an electrical signal.

82. The method of claim 81 wherein the image acquisition device further includes at least one additional sensor, and wherein controlling the actuator includes measuring intensity of the light reaching the sensor array or the at least one additional sensor, thereby providing the electrical signal.

83. The method of claim 62 wherein controlling the actuator includes measuring intensity of the light diffracted by the HOE thereby providing the electrical signal.

84. The method of claim 83 wherein controlling the actuator includes measuring the difference of the intensities of the light diffracted by the HOE and the undiffracted light thereby providing the electrical signal.

85. The method of claim 81 wherein the image acquisition device further includes at least one additional hologram disposed next to the HOE, and wherein compensating for temperature-induced changes in the Bragg matching condition of the HOE includes measuring intensities of the light diffracted from the additional holograms thereby obtaining the electrical signal.

86. The method of claim 81 wherein the HOE includes at least two co-locationally multiplexed holograms, and wherein compensating for temperature-induced changes in the Bragg matching condition of the HOE includes recording the multiplexed holograms so that the Bragg matching condition of the multiplexed holograms is substantially overlapping.

87. The method of claim 86 wherein compensating for temperature-induced changes in the Bragg matching condition of the HOE includes recording the multiplexed holograms so that the grating periods of said holograms are not equal.

88. The method of claim 81 wherein compensating for temperature-induced changes in the Bragg matching condition of the HOE includes recording planar-angle multiplexed holograms so that the increment of the recording angle is less than the width of the Bragg angle selectivity of each multiplexed hologram.

89. The method of claim 76 wherein the position of one or more of the light source, a lens element or the waveguide is manually controlled by measuring the intensity of the light diffracted by the HOE and detected by one or more of a plurality of pixels of the sensor array.

90. The method of claim 76 wherein the device further includes at least one additional sensor, and further wherein the position of one or more of the light source, a lens element or the waveguide is manually controlled by measuring the intensity of the light diffracted by the HOE and detected by the at least one additional sensor.

91. The method of claim 76 wherein the light source is a laser diode, and wherein compensating for temperature-induced changes in the Bragg matching condition of the HOE includes configuring the laser diode to change the operating wavelength in response to temperature.

92. The method of claim 76 wherein compensating for temperature-induced changes in the Bragg matching condition of the HOE includes configuring the light source to produce a broad wavelength spectrum light.

93. The method of claim 76 further including selecting the HOE that diffracts the light beam in a direction that differs from the perpendicular to the skin contact layer by an angle that exceeds the angular width of the Bragg angle selectivity of the hologram.

94. The method of claim 76 further including selecting the HOE that includes at least two multiplexed holograms.

95. The method of claim 94 further including selecting the HOE so that each of the multiplexed holograms has a diffraction efficiency of at least about 50%.

96. The method of claim 94 further including selecting the HOE so that each of the multiplexed holograms has a diffraction efficiency of at least about 75%.

97. The method of claim 94 further including selecting the HOE so that each of the multiplexed holograms has a diffraction efficiency of at least about 90%.

98. The method of claim 76 further including selecting the skin contact layer that has optical power thereby directing the light reflected from the interface between skin and the contact layer at the sensor array.

99. The method of claim 76 wherein the image acquisition device further includes a lens element attached to skin contact layer configured to direct the light reflected from the interface between skin and the contact layer at the sensor array.

100. The method of claim 76 wherein the skin contact layer comprises a layer of a polymer having a glass transition temperature less than an ambient use temperature of the device.

101. The method of claim 76 wherein the skin contact layer is coated with a layer of polymer having a glass transition temperature less than ambient use temperature of the device.

102. The method of claim 76 wherein the skin contact layer comprises a glass material having a refractive index between about 1.45 and 1.50.

103. The method of claim 76 wherein the skin contact layer comprises a top surface having surface energy of less than about 30 mJ/m$^2$.

104. The method of claim 76 further including at least one of a ¼ wave plate and a linear polarizer disposed between the skin contact layer and the sensor array.

105. The method of claim 104 wherein the ¼ wave plate is disposed between the HOE and the skin contact layer and the linear polarizer is disposed between the waveguide and the sensor array.

106. The method of claim 104 wherein at least one surface of the polarizer includes an antireflection coating.

107. The method of claim 104 wherein at least one surface of the polarizer includes a dielectric layer.

108. The method of claim 107 wherein the dielectric layer includes a polymeric film having a glass transition temperature less than ambient use temperature of the device.

109. The method of claim 107 wherein the dielectric layer includes derivatives of silicone or siloxane.

110. The method of claim 76 wherein the light source wavelength is in a range from about 400 nm to about 1000 nm.

111. The method of claim 110 wherein the light source wavelength is in a range from about 400 nm to about 535 nm.

112. The method of claim 76 wherein at least one of the surfaces of the waveguide, or the sensor array include an antireflection coating.

113. The method of claim 76 wherein at least one of the surfaces of the waveguide, or the holographic optical element, or the sensor array, or the skin contact layer include a dielectric layer.

114. The method of claim 76 wherein the sensor array has a resolution of at least 1100 pixels per inch.

115. The method of claim 73 wherein the HOE includes a layer comprising a grating and at least one supporting layer in contact with said grating layer, and wherein compensating for the temperature-induced changes in the Bragg matching condition of the HOE includes selecting layers of the HOE to have substantially similar coefficients of thermal expansion or thermo-optic coefficient or both.

116. The method of claim 73 further including selecting the HOE that is optimized for s-polarized light.

117. The method of claim 73 further including selecting the HOE that is optimized for p-polarized light.

118. The method of claim 73 further including selecting the HOE that is polarization independent.

119. The method of claim 73 further including selecting the waveguide having the entrance edge that forms an oblique angle with the top and the bottom surfaces.

120. The method of claim 73 further including selecting the waveguide having the entrance edge that has optical power and thereby directing the light beam from the light source at the HOE.

121. The method of claim 73 further including selecting the waveguide having light traps at the surface opposite to the entrance edge.

122. The method of claim 73 further including selecting the waveguide having a reflective metal coating along its bottom surface at or near the entrance edge of the waveguide.

123. The method of claim 76 further including directing the light beam through a wave plate disposed between the light source and the entrance edge of the waveguide and configured to produce a direction of polarization that is optimal for diffraction by the HOE.

124. The method of claim 123 wherein the wave plate is a half-wave plate.

* * * * *